United States Patent
Kwak et al.

(10) Patent No.: US 8,131,275 B2
(45) Date of Patent: Mar. 6, 2012

(54) BROADCASTING TERMINAL AND METHOD OF CONTROLLING VIBRATION OF A MOBILE TERMINAL

(75) Inventors: Jaedo Kwak, Seoul (KR); Taeik Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 733 days.

(21) Appl. No.: 11/934,714

(22) Filed: Nov. 2, 2007

(65) Prior Publication Data

US 2008/0108343 A1    May 8, 2008

(30) Foreign Application Priority Data

Nov. 3, 2006  (KR) .................. 10-2006-0108427

(51) Int. Cl.
*H04L 29/06* (2006.01)
(52) U.S. Cl. .................. 455/414.3; 455/414.1; 455/567
(58) Field of Classification Search .................. 455/418, 455/567, 414.3, 414.1
See application file for complete search history.

(56) References Cited

U.S. PATENT DOCUMENTS

| | | | |
|---|---|---|---|
| 2005/0197141 A1* | 9/2005 | Jiang et al. | 455/457 |
| 2006/0121887 A1* | 6/2006 | Chilukoor | 455/412.2 |
| 2006/0184977 A1* | 8/2006 | Mueller et al. | 725/86 |
| 2007/0011699 A1* | 1/2007 | Kopra et al. | 725/22 |
| 2007/0057913 A1* | 3/2007 | Eid et al. | 345/156 |
| 2007/0236449 A1* | 10/2007 | Lacroix et al. | 345/156 |
| 2008/0080502 A1* | 4/2008 | Frank et al. | 370/392 |

FOREIGN PATENT DOCUMENTS

| | | |
|---|---|---|
| JP | 2005-333365 | 12/2005 |
| KR | 1020050045700 | 5/2005 |
| KR | 1020060079813 | 7/2006 |

* cited by examiner

*Primary Examiner* — Barry Taylor
(74) *Attorney, Agent, or Firm* — Lee, Hong, Degerman, Kang & Waimey

(57) ABSTRACT

A method of controlling vibration of a mobile terminal includes receiving broadcast data including vibration control information for controlling the vibration of the mobile terminal and vibrating the mobile terminal responsive to the vibration control information. A mobile terminal includes a vibration device for generating vibration, a broadcast receiver for receiving broadcast data comprising vibration control information and a controller for controlling the vibration device to generate the vibration, responsive to the vibration control information.

35 Claims, 25 Drawing Sheets

```
<absolute_geo object_id="19" key_name="IgeAbsoluteGeo" version="0">
        <name object id="4" />
        <bounding_box_max>30.0 30.0 0.0</bounding_box_max>
        <bounding_box_min>-30.0 -30.0 0.0</bounding_box_min>
        <vertex_format>215</vertex_format>
        <primitive_type>4</primitive_type>
        <usage>0</usage>
        <vertices> -30.00000 -30.00000 0.00000   0.00000 0.00000 1.00000   0.00049 0.00049
0.00000 0.00000 0.00000 0.99998   1.00000 0.00000 0.00000   0.00000 0.99998 0.00000   30.00000 -30.00000 0.00000
0.00000 0.00000 1.00000   0.99950 0.00049   0.00000 0.00000 0.00000 0.99998   1.00000 0.00000 0.00000   0.00000 0.99998
0.00000   30.00000 30.00000 0.00000   0.00000 0.00000 1.00000   0.99950 0.99950   0.00000 0.00000 0.00000 0.99998
1.00000 0.00000 0.00000   0.00000 0.99998 0.00000   -30.00000 30.00000 0.00000   0.00000 0.00000 1.00000
0.00049 0.99950   0.00000 0.00000 0.00000 0.99998   1.00000 0.00000 0.00000   0.00000 0.99998 0.00000  </vertices>
        <indices> 0 1 2 3 0 2 </indices>
    </absolute_geo>
  </geap>
 </geap_list>
 </child>
</children>
<mat1>0.11383056 0.0 0.0 0.0</mat1>
<mat2>0.0 0.0 0.11383056 0.0</mat2>
<mat3>0.0 -0.11383056 0.0 0.0</mat3>
<mat4>0.0 0.0 0.0 1.0</mat4>
```
40 —— `<Vib_bell> 0 0 0 12 </Vib_bell>`
```
<transform_animator object_id="-1" />
 </child>
</children>
<mat1>1.0 0.0 0.0 0.0</mat1>
<mat2>0.0 1.0 0.0 0.0</mat2>
<mat3>0.0 0.0 1.0 0.0</mat3>
<mat4>0.0 0.0 0.0 1.0</mat4>
<transform_animator object_id="-1" />
</scene>
```

FIG. 5

| Number of bits | Field name | Value |
|---|---|---|
| | ES_Descriptor (BIFS) | |
| 8 | ES_Descriptor tag | 0x03 |
| 8 | descriptor size | - - - |
| 16 | ES_ID | 2 |
| 1 | streamDependenceFlag | 0 |
| 1 | URL_Flag | 0 |
| 1 | OCRstreamFlag | 0 |
| 5 | streamPriority | 0 |

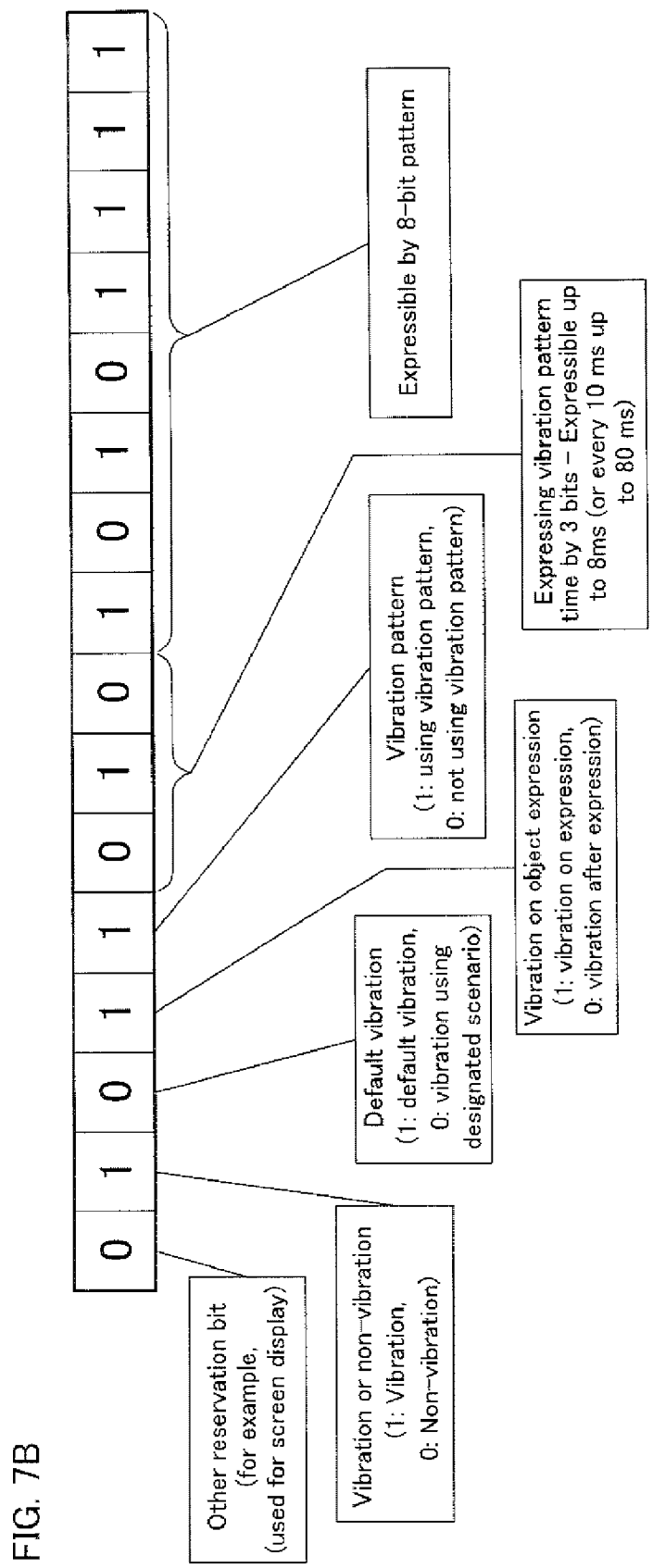

FIG. 11A

| $b_7b_4$ | Description |
|---|---|
| 0 0 0 0 | complete EBU Latin based repertoire [25] |
| 0 0 0 1 | EBU Latin based common core, Cyrillic, Greek [25] |
| 0 0 1 0 | EBU Latin based core, Arabic, Hebrew, Cyrillic, Greek [25] |
| 0 0 1 1 | ISO Latin Alphabet No 2 (see ISO-8859 Part 2 [7]) |
| 0 1 0 0 | ISO Latin Alphabet No 1 (see ISO-8859 Part 1 [6]) |

FIG. 11B

| Parameter Id $b_5$ $b_0$ | Parameter | Definition | Possible occurrences | Usage mandatory for content provider | Support mandatory for MOT decoders |
|---|---|---|---|---|---|
| 00 0000 | reserved for MOT protocol extensions | | | | |
| 00 0001 | PermitOutdatedVersions | 6.2.3.1.2 | only once | no | on |
| 00 0010 00 0011 00 0100 | reserved for MOT protocol extensions | | | | |
| 00 0101 | TriggerTime (user application specific parameter) | see [5] | see [5] | see [5] | see [5] |
| 00 0110 | reserved for MOT protocol extensions | | | | |
| 00 0111 | RetransmissionDistance | 6.2.3.1.5 | only once | no | on |
| 00 1000 | reserved for MOT protocol extensions | | | | |
| 00 1001 | Expiration | 6.2.3.1.1 | only once | see [5] | yes, if receiver privides "MOT caching support" |
| 00 1010 | Priority | 6.2.3.1.4 | only once | no | on |
| 00 1011 | Label (user application specific parameter) | see [6] | only once | no | on |
| 00 1100 | contentName | 6.2.2.1.1 | only once | yes | yes |
| 00 1101 | UniqueBodyVersion | 6.2.3.1.3 | only once | no | on |
| 00 1110 00 1111 | reserved for MOT protocol extensions | | | | |
| 01 0000 | MimeType | 6.2.2.1.2 | only once | user application specific | user application specific |
| 01 0001 | CompressionType | 6.2.2.1.3 | only once | Yes (if body is compressed) | yes; every receiver must check if an object is compressed |
| 01 0010 ... 01 1111 | reserved for MOT protocol extensions | | | | |
| 10 0000 | AdditionalHeader (user application specific parameter) | see [6] | once or several times | see [6] | see [6] |
| 10 0001 | ProfileSubset | 6.2.3.3.1 | only once | no | on |
| 10 0010 | reserved for MOT protocol extensions | | | | |
| 10 0011 | CAInfo | 6.2.3.2.1 | only once | Yes (if CIA is used) | yes; every receiver must check if an object is scrambled |
| 10 0100 | CAReplacementObject | 6.2.3.2.2 | only once | no | on |
| 10 0101 ... 11 1111 | reserved for user application specific parameters | | | | |

FIG. 15

| Field name | type | description |
|---|---|---|
| CNAME | 1 | Canonical End-Point Identifier |
| NAME | 2 | Common name of source |
| EMAIL | 3 | Email address of source |
| PHONE | 4 | Phone number of source |
| LOC | 5 | Geographic location of site |
| TOOL | 6 | Name/version of source application |
| NOTE | 7 | Note about the source |
| PRIV | 8 | Private extension |

BROADCASTING TERMINAL AND METHOD OF CONTROLLING VIBRATION OF A MOBILE TERMINAL

CROSS-REFERENCE TO RELATED APPLICATIONS

Pursuant to 35 U.S.C. §119(a), this application claims the benefit of earlier filing date and right of priority to Korean Application No. 10-2006-0108427, filed on Nov. 3, 2006, the contents of which are hereby incorporated by reference herein in their entirety.

FIELD OF THE INVENTION

The present invention relates to broadcasting, and more particularly, to broadcasting vibration control information within broadcast data.

DISCUSSION OF THE RELATED ART

The merger of mobile communication and broadcasting technologies has brought forth technologies were users may enjoy broadcasts in traditional fixed time and environments as well as viewing the broadcasts at any time in any environment.

Various types of mobile digital broadcasts are provided worldwide, such as the Korean Digital Multimedia Broadcasting (DMB) standard. Various standards for digital broadcasts targeting mobile terminals are being proposed, discussed, and adopted in addition to the related-art digital broadcasting that targets a fixed type receiver. Owing to this trend, a user can receive digital broadcast content including various types of multimedia beyond the limitations of place and time.

The user can view various forms of multimedia content received over various broadcast channels using a mobile terminal that can receive a broadcast signal from a broadcasting station.

The recent advent of digital television (TV) has introduced various digital services. As a result, broadcasting stations are increasingly required to provide new formats of broadcasting content to satisfy the various desires of a user. Accordingly, there is a need for broadcast stations to provide new formats of broadcasting content based on the proliferation of mobile terminals.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In accordance with an embodiment, a method of controlling vibration of a mobile terminal includes receiving broadcast data comprising vibration control information for controlling the vibration of the mobile terminal vibrating the mobile terminal responsive to the vibration control information.

In one feature, the broadcast data comprises a broadcast object, and the vibrating is implemented while the broadcast object is reproduced at the mobile terminal. At least a portion of the vibration control information synchronizes with a time for displaying the broadcast object and with content of the broadcast object. The broadcast object and the vibration control information are received over separate broadcast channels. The vibration control information is received using BInary Format for Scenes (BIFS) or Multimedia Object Transfer (MOT) protocol. The broadcast object comprises at least one of video, audio, and data. The vibration control information comprises at least one of vibration time, vibration duration, and vibration pattern.

In another feature, the vibration generation in the mobile terminal is selectively enabled or disabled. The vibration control information comprises a vibration override code which permits the vibration in the mobile terminal even if the vibration generation in the mobile terminal is disabled. The vibration control information is implemented in the broadcast data by a request of the mobile terminal. The request of the mobile terminal is implemented while the broadcast data is received over the broadcast channel and the request of the mobile terminal is implemented over a return channel separate from the broadcast channel, when the broadcast channel is a one-way channel. Additionally, the request of the mobile terminal is implemented over the broadcast channel, when the broadcast channel is a two-way channel.

In yet another feature, a method of controlling vibration of a mobile terminal includes receiving an organization table of the vibration control information, before or during receiving the broadcast data setting at least a portion of the vibration control information to be enabled in the mobile terminal with reference to the received organization table. The organization table is received over the broadcast channel.

In one embodiment a mobile terminal includes a vibration device for generating vibration, a broadcast receiver for receiving broadcast data comprising vibration control information, and a controller for controlling the vibration device to generate the vibration, responsive to the vibration control information.

These and other embodiments will also become readily apparent to those skilled in the art from the following detailed description of the embodiments having reference to the attached figures, the invention not being limited to any particular embodiment disclosed.

BRIEF DESCRIPTION OF THE DRAWINGS

The above and other aspects, features, and advantages of the present invention will become more apparent upon consideration of the following description of preferred embodiments, taken in conjunction with the accompanying drawing figures.

FIG. 4 is a diagram illustrating an example of expressing a vibration object using BIFS VRML.

FIG. 5 is a diagram illustrating a field definition of an ES_Descriptor of BIFS.

FIGS. 7A and 7B are diagrams illustrating examples of expressing vibration control information using an ES_ID field (2 bytes).

FIGS. 11A and 11B are diagrams illustrating MOT protocols.

FIG. 15 is a diagram illustrating various fields comprised in an RTCP compound packet.

DETAILED DESCRIPTION OF THE PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Broadcasting standards referred to in this specification include Digital Audio Broadcasting (DAB), Digital Video Broadcasting-Handheld (DVB-H) of Europe based on Eureka-147 [ETSI EN 300 401], Media Forward Link Only (FLO) of the United States, Digital Multimedia Broadcasting (DMB) of Korea, and Integrated Service Digital Broadcasting-Terrestrial (ISDB-T) of Japan. The DMB of Korea is classified into Terrestrial-Digital Multimedia Broadcasting (T-DMB) based on Eureka-147, and Satellite-Digital Multimedia Broadcasting (S-DMB) based on a satellite communication. A detailed description of each broadcasting standard will be omitted. However, it is to be understood that embodiments of the present invention are not so limited and may alternatively be implemented using other standards than those noted above.

A description of a method of transmitting and receiving broadcast data including motion control information for controlling a mechanical motion of a broadcasting terminal will be made below. The description will focus on the vibration of a mobile terminal, however, the technological scope of the current embodiment relating to the mechanical motion of a mobile terminal is not limited to vibration of a mobile terminal.

Figure 1:
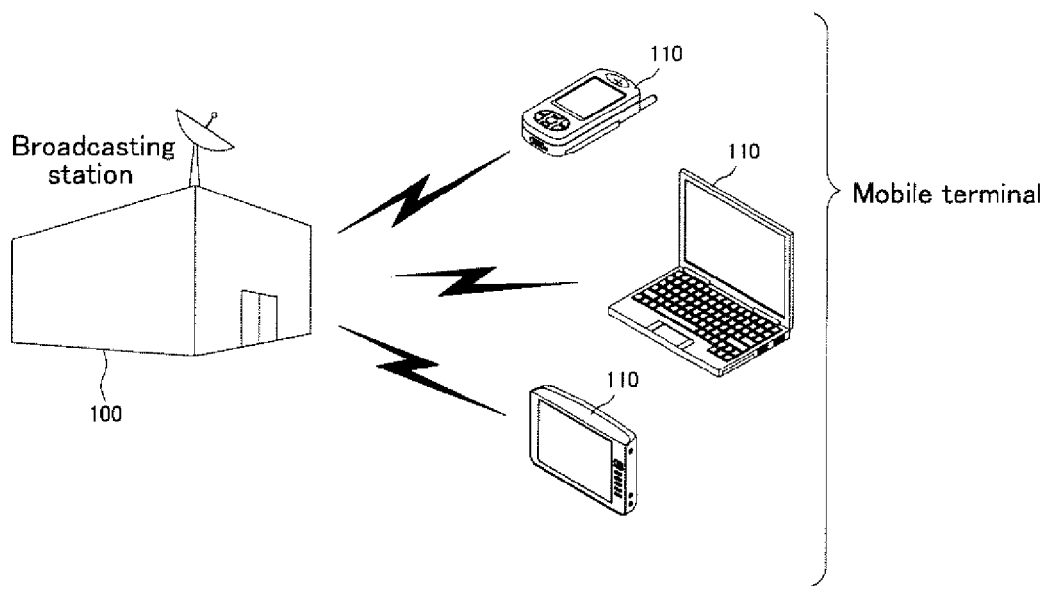
FIG. 1 is a schematic diagram illustrating a broadcasting system according to an embodiment of the present invention.

FIG. 1 is a schematic diagram illustrating a broadcasting system according an embodiment of the present invention. The figure shows a broadcasting system having a broadcasting station 100 for transmitting broadcast data, and various mobile terminals 110 for receiving the broadcast data.

The broadcasting station 100 transmits broadcast data that includes motion control information for controlling mechanical motion of various mobile terminals 110. For example, motion control information may include vibration control information for controlling vibration provided to mobile terminal 110. In the present embodiment, a vibration mechanism of mobile terminal 110 is controlled using the vibration control information, thereby vibrating mobile terminal 110.

Figure 2:
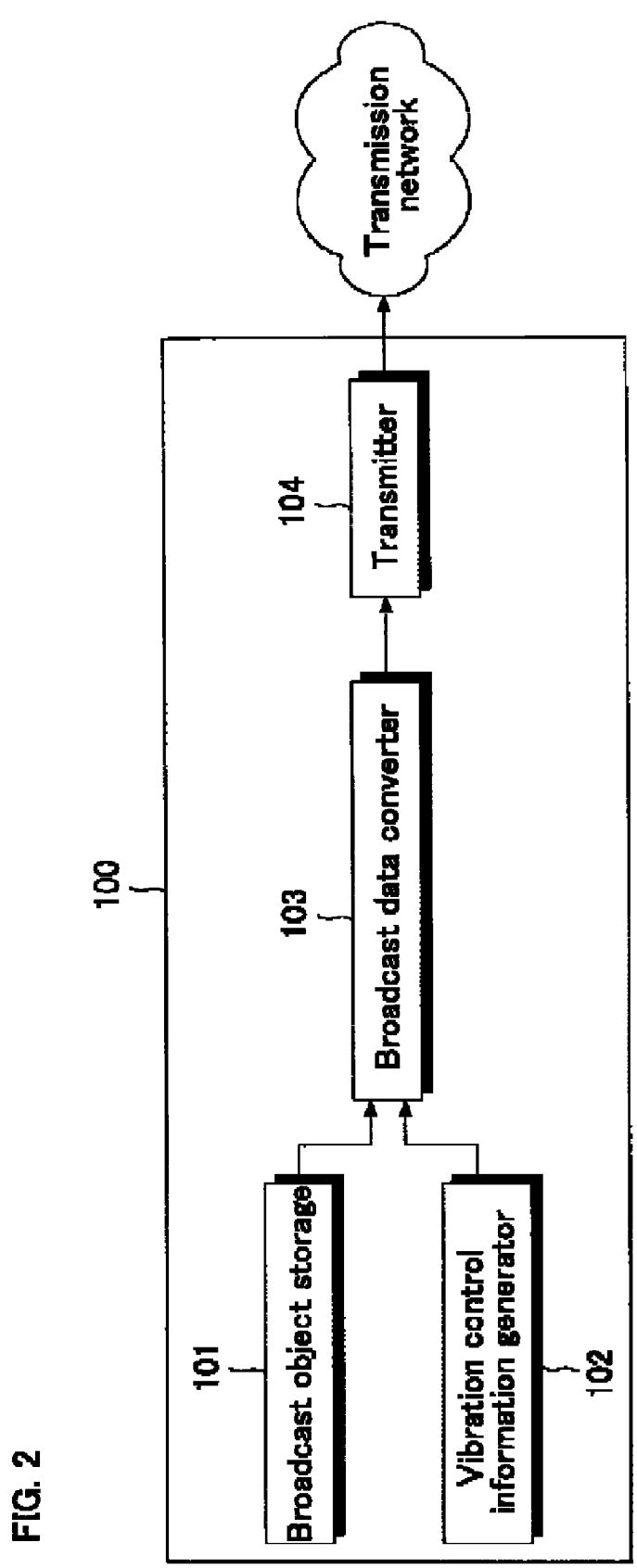
FIG. 2 is a block diagram illustrating an example of a broadcasting station for transmitting broadcast data containing vibration control information according to an embodiment of the present invention.

FIG. 2 is a block diagram illustrating an example of a broadcasting station for transmitting the broadcast data containing vibration control information according to an embodiment. Broadcasting station 100 includes a broadcast object storage 101, a vibration control information generator 102, a broadcast data converter 103, and a transmitter 104.

Broadcast object storage 1001 stores at least one broadcast object to be transmitted to mobile terminal 110. Broadcast object storage 101 can receive and store a broadcast object generated from another apparatus. Alternately, broadcast object storage 101 can generate and store a broadcast object to be transmitted. A broadcast object may comprise at least one of a video, an audio, and data.

The vibration control information generator 102 generates the vibration control information for controlling the vibration among the mechanical motions of the mobile terminal 110. The vibration control information can comprise information on at least one of a vibration or non-vibration state, a vibration time, a vibration duration, and a vibration pattern.

The vibration time refers to a point in time during which the mobile terminal 110 generates vibration. In one embodiment the vibration time may be synchronized with a time point when a specific broadcast object is displayed by the mobile terminal 110. For example, the vibration time can be a start or end time point of a specific program such as a news program. In another embodiment, the vibration time can be coupled with a specific broadcast object. For example, the vibration time can be a time point when the scene of a goal in a soccer game is reproduced in the mobile terminal 110.

The vibration duration includes reference to a duration of time for sustaining the vibration generated in the mobile terminal 110. In one embodiment, the vibration duration refers to a duration of time for sustaining an initial vibration from the vibration time to a time when one vibration event ends. The vibration duration may be defined in various units. For example, the unit of the vibration duration may be 300 ms, 2 seconds, and the like.

The vibration pattern includes reference to a format of generating the vibration in the mobile terminal 110. For example, in one embodiment a vibration pattern may be rhythmically generated in tempo to a specific melody or rhythm. In another embodiment, the vibration pattern may be generated based on a specific vibration period, such as repeating a pattern of vibration of 4 ms and non-vibration of 4 ms.

The vibration control information can contain vibration override code for forcing the vibration of the mobile terminal 110. As described later, the mobile terminal 110 can be set to enable or disable a vibration control function according to an embodiment of the present invention. When the mobile terminal 110 is set to disable the vibration control function, the mobile terminal 110 does not generate vibration after receiving the vibration control information. The vibration override code will force the mobile terminal 110 to vibrate in accordance with the vibration control information irrespective of the disabled setting. For example, in one embodiment a method for controlling the vibration of the broadcasting terminal according to an embodiment of the present invention can be used for advertisement broadcasting. When an advertisement is broadcasted to a mobile terminal 111, a vibration override code is inserted into the vibration control information, thus even if a user disables the vibration control function, the mobile terminal 110 will vibrate when it has received the broadcast information containing the advertisement with the vibration override code.

The broadcast data converter 103 converts the broadcast object stored in the broadcast object storage 101 and the vibration control information outputted from the vibration control information generator 102, into transmissible broadcast data format. Alternately, the broadcast data converter 103 can packetize a broadcast signal in compliance with a broadcast signal transmission principle or broadcasting standard.

The transmitter 104 receives the broadcast signal from the broadcast data converter 103, and transmits the received broadcast signal over a transmission network.

A technique of transmitting the vibration control information and its dependent data architecture can be diversified depending on several communication/broadcasting standards. Several embodiments of transmitting the vibration control information and the data architecture will be described below.

Case of Using BIFS

In one embodiment, the vibration control information can be transmitted using BIFS (Binary Format for Scenes), a kind of data service channel. BIFS is an Motion Picture Experts Group (MPEG)-4 multimedia compression technology. MPEG-4, an object-based multimedia compression technique, divides contents into several objects constituting a scene, and compresses the divided contents. BIFS has been developed as a scene description standard for expressing a temporal spatial arrangement between respective objects.

Three main elements for generating the scene in an MPEG-4 system are an object descriptor, a scene descriptor, and coded audio-visual data. These elements are transmitted as respective elementary streams. The elementary streams are multiplexed and transmitted through a specific network like an MPEG-2 transport stream or a Transmission Control Protocol (TCP) stream.

Among the transmitted streams, the object descriptor provides a method of recognizing and searching, by a decoder, the elementary stream for the audio-visual stream. The object descriptor describes a type and feature of each audio-visual stream. In other words, the object descriptor provides decoding information, and provides a link between the audio-visual stream and the scene descriptor.

The scene descriptor can define temporal spatial behaviors of the objects and construct the scene. The scene descriptor can also execute an interaction with the user. If the embodiment has a return channel, a user request can be executed using the return channel.

BIFS is based on Virtual Reality Modeling Language (VRML) that is a language describing a two-dimensional or three-dimensional model in a text document format. BIFS expresses the contents in a scene tree or object tree format in which each object constituting the contents, such as the audio-visual data, is defined as a node. Each node can include information on a spatial position in the scene and a relative temporal position in the contents, together with visual feature information required to render each node. Additionally each node can comprise a rule of a variation dependent on time. The scene tree can express information required for interaction between the nodes, together.

As such, BIFS can express various objects only on the video stream (for example, the MPEG-4 based video stream) using the object tree. Thus, link setting for each variety of information using an object concept of BIFS is possible.

Figure 3:
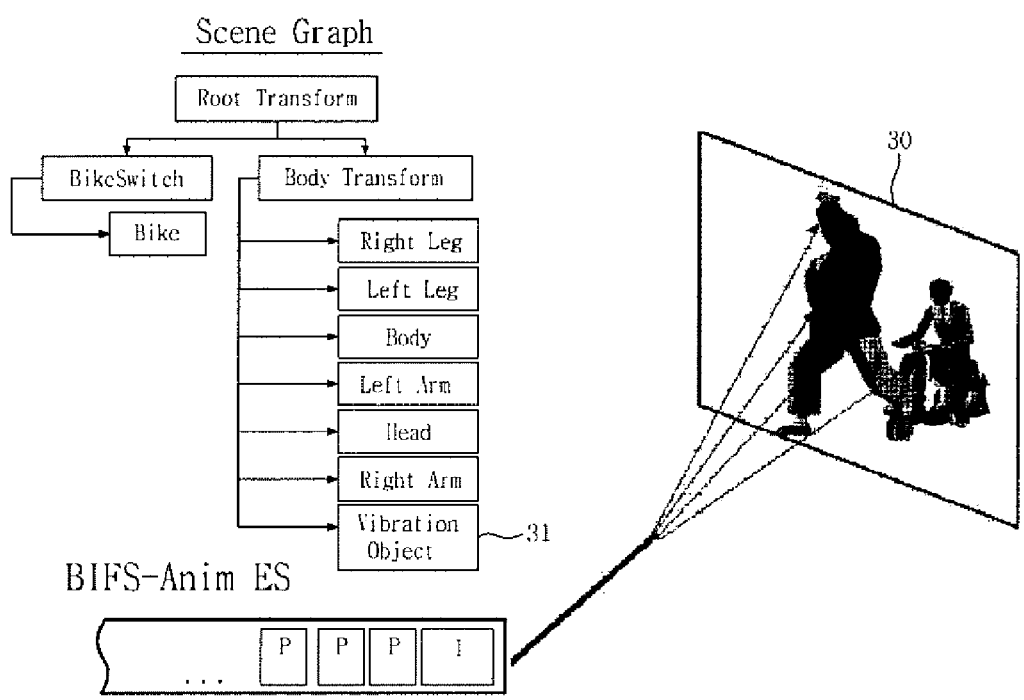
FIG. 3 is a diagram illustrating an example of defining a vibration object using BIFS.

FIG. 3 is a diagram illustrating an example of defining the vibration object using BIFS. In FIG. 3, an object for an animation 30 is defined using a scene graph expressed with a plurality of scene descriptors. The scene graph can additionally define a vibration object 31. The vibration object 31 can express vibration control information including vibration time, vibration duration, and vibration pattern in a text format. In other words, if vibration object 31 and animation 30 defined in the scene graph of FIG. 3 are synchronized and transmitted in compliance to a standard of BIFS, a receiving side receiving the animation 30 generates vibration using the vibration control information comprised in the vibration object 31. As such, the vibration control information can be defined and transmitted as one object.

FIG. 4 is a diagram illustrating an example of expressing the vibration object using BIFS VRML. In FIG. 4, a reference numeral 40 denotes the vibration object. For example, data of "0 0 0 12" expressed in the vibration object 40 will be described as follows. The first "0" represents the vibration or non-vibration state, and the second "0" represents whether the vibration object 40 uses a simple vibration (default) or a vibration scenario designated by the broadcasting station 100. The third "0" represents whether the vibration is generated upon reproduction of the broadcast object interworking with the vibration object, or if the vibration is generated upon reproduction completion of the broadcast object. The last "12" represents the vibration duration, for example, 12 ms.

FIG. 5 is a diagram illustrating a field definition of an ES_Descriptor of BIFS. The vibration control information can be expressed using an Elementary Stream IDentifier (ES_ID) field 50 of FIG. 5. In other words, the vibration time, the vibration duration, and the vibration pattern can be expressed in the ES_ID field 50 having a length of 16 bits by a bit string or byte unit. The ES_ID field 50 is a field arbitrarily managed by a broadcasting company. Thus, the broadcasting company can dynamically express and transmit the vibration control information using the ES_ID field 50.

Figure 6:
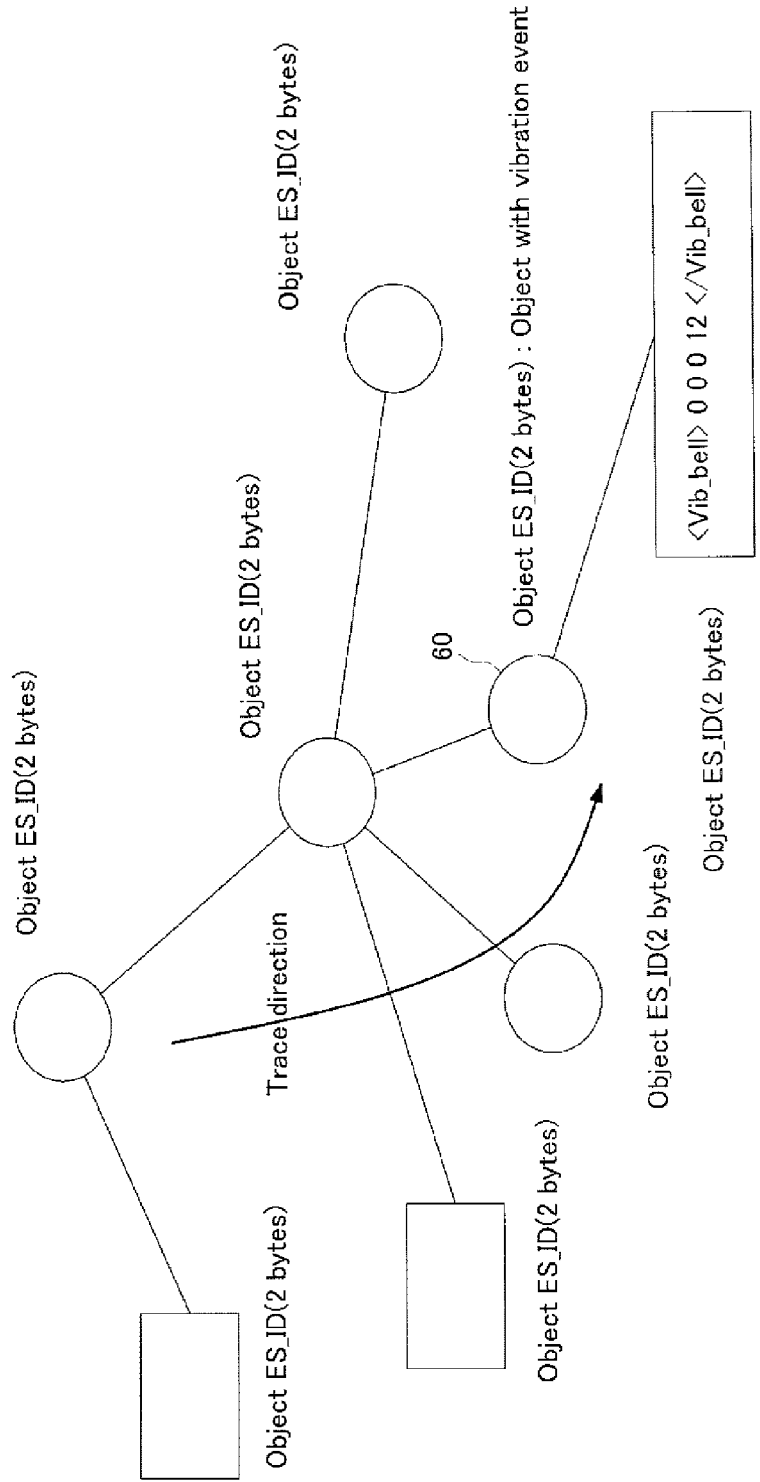
FIG. 6 is an example of a BIFS VRML object arrangement architecture based on Core 2D profile 1.0.

FIG. 6 is an example of a BIFS VRML object arrangement architecture based on Core 2D profile 1.0. The Core 2D profile 1.0 refers to a standard for scene construction among MPEG-4 BIFS standards, defined in ISO/IEC 14496-1. As shown in FIG. 6, predetermined vibration control information can be matched to a specific object 60 to generate a vibration event for the specific object 60.

Figure 7A:
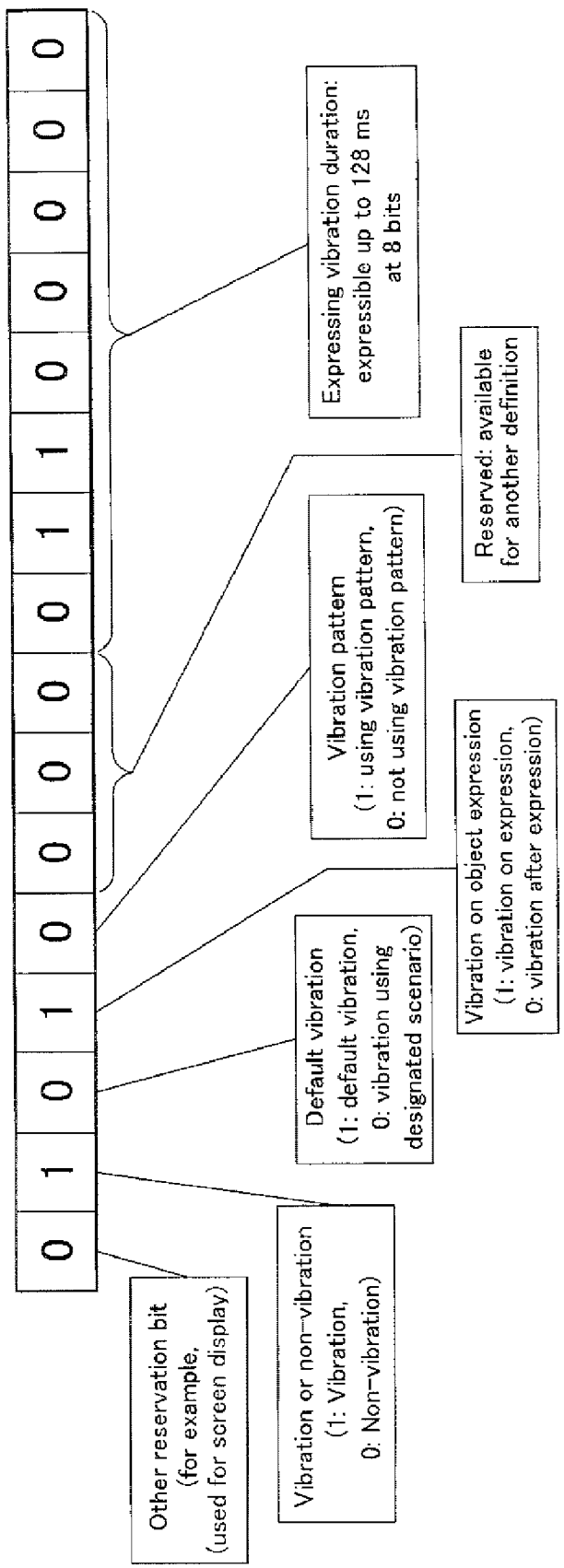

FIGS. 7A and 7B are diagrams illustrating examples of expressing the vibration control information using the ES_ID field (2 bytes). As shown in these figures, the vibration or non-vibration state, the vibration time, the vibration duration, and the vibration pattern can be expressed using the ES_ID field. FIG. 7A expresses the vibration duration without the vibration pattern, and FIG. 7B expresses the vibration duration with the vibration pattern.

Case of Using MOT Protocol

Figure 8:
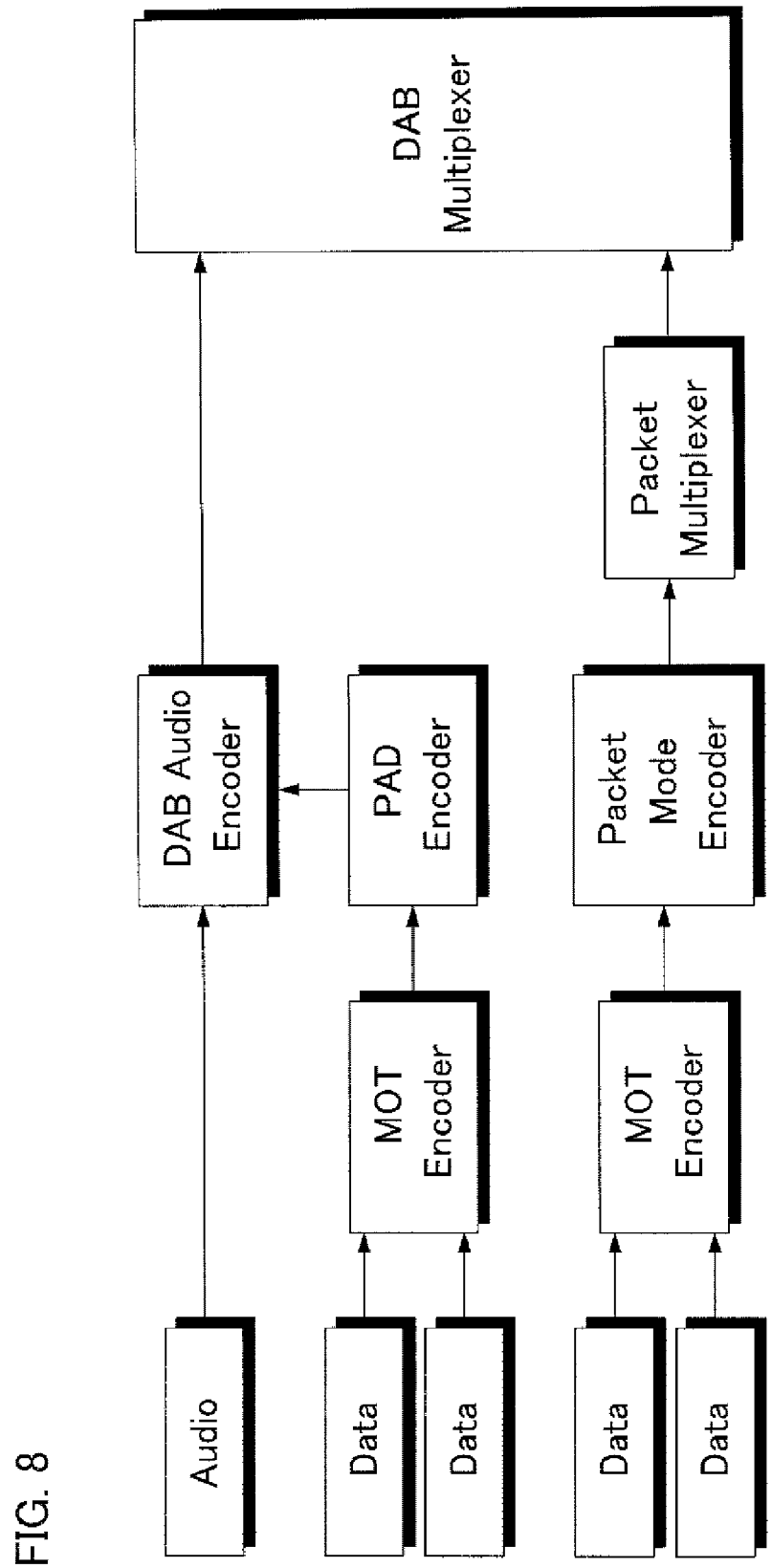
FIG. 8 is a diagram illustrating a DAB transmission architecture using MOT.

Vibration control information can be transmitted using an MOT (Multimedia Object Transfer) protocol, for example. The MOT protocol includes a transfer protocol established to provide a function of transmitting a multimedia object in a DAB system (Eureka-147). The MOT protocol uses packet mode and X-PAD of DAB to transmit the multimedia object, and supports various systems and data formats. FIG. 8 is a diagram illustrating a DAB transmission architecture using MOT.

Figure 9:
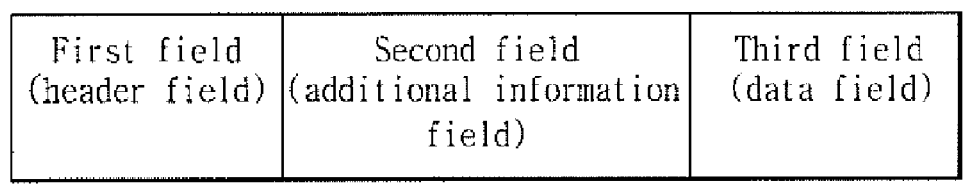
FIG. 9 is a diagram illustrating an example of a broadcast data architecture that includes vibration control information according to an embodiment of the present invention.

FIG. 9 is a diagram illustrating an example of a broadcast data architecture for vibration control information according to an embodiment of the present invention. The broadcast data architecture of FIG. 9 may contain a first field for information on a signal structure of the transmitted broadcast object; a second field for additional information required when the broadcast object is reproduced; and a third field for raw data on the broadcast object. The vibration control information may be included in the second field, but is not intended to limit the scope of the current embodiment.

The first field is a header field that can be transmitted together when the broadcast object is transmitted. The second field is used for additional information. The third field is a field for transmitting data on the broadcast object. Accordingly, terms used in this specification should be understood in view of their meanings, not limited to their names.

An example of transmitting the vibration control information using the MOT protocol will be described with reference to FIGS. 10, 11A, and 11B as follows.

Figure 10:
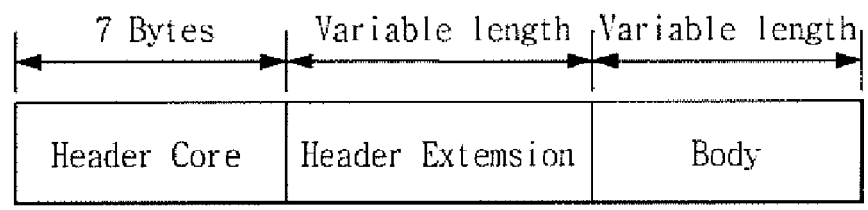
FIG. 10 is a diagram illustrating an MOT data architecture that is a detailed example of the broadcast data architecture of FIG. 9.

FIG. 10 is a diagram illustrating MOT data architecture, a detailed example of the broadcast data architecture of FIG. 9, In FIG. 10, a header core field comprises information on object size and content, and a header extension field comprises object processing information. For example, the vibration control information may be transmitted in the header extension field for expressing the additional information or the object processing information.

FIGS. 11A and 11B are diagrams illustrating the MOT protocols. FIG. 11B is a diagram illustrating a partial data field of a DAB MOT protocol of ETSI EN 301 234 V2.1.1. The data architecture including the vibration control may be defined in a reserved field of the MOT protocol. The reserved field is shadowed and shown in FIG. 11B.

The vibration control information may be defined in the data field having a variable length among the reserved field of the MOT protocol, for extension of the method of transmitting and receiving the broadcast data comprising the vibration control information. The vibration control information may be inserted into a fixed length field. Additionally, the data field with the variable length may provide an extension for field definition.

FIG. 11B shows that the data architecture for expressing the vibration control information may be inserted into a ContentName field having a variable length. FIG. 11A is an example of a feature indicator for filling the ContentName field. A shadow portion represents an example of the ContentName field filled with data by Arabic numerals, for transmission.

Figure 12:
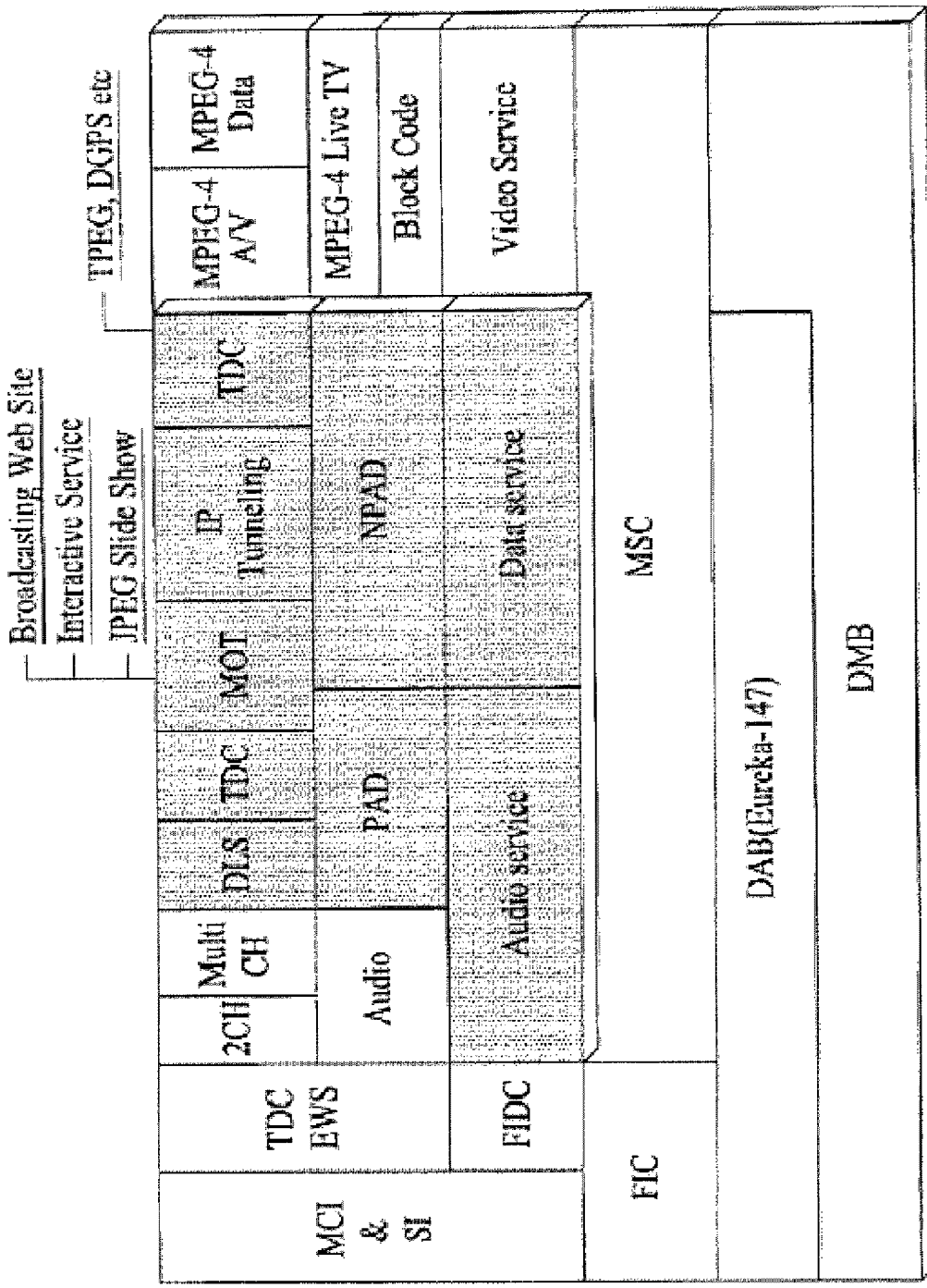
FIG. 12 is a diagram illustrating a protocol stack of terrestrial DMB.

FIG. 12 is a diagram illustrating a protocol stack of terrestrial DMB. A shadow portion of FIG. 12 can serve as a data broadcast channel. The data broadcast channel, which is a transfer path for the vibration control information in the terrestrial DMB, can use the MOT protocol as described above. However, the data broadcast channel can use other data broadcast channels.

Case of Using RTCP or FLUTE of DVB-H

Figure 13:
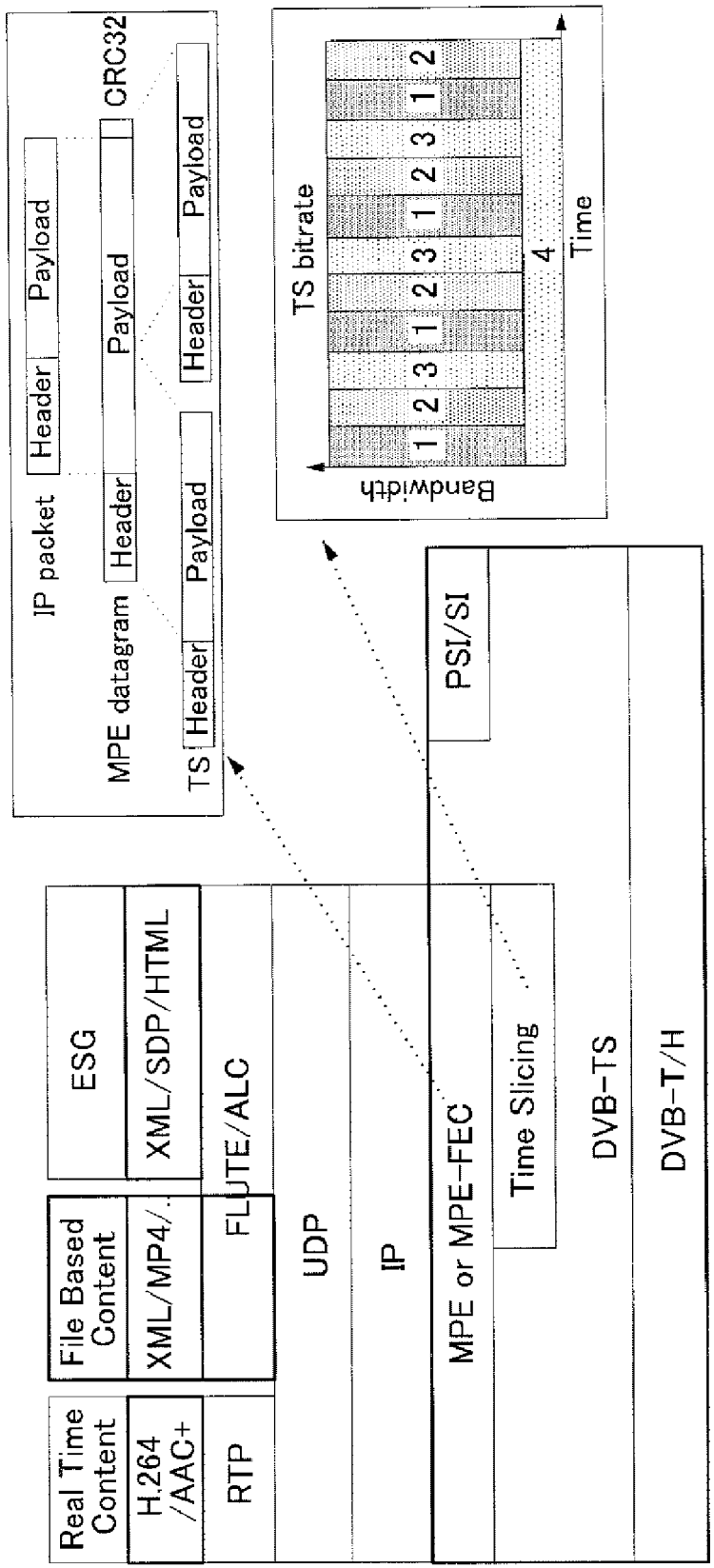
FIG. 13 is a diagram illustrating a protocol stack of DVB-H.

The vibration control information can be transmitted using data architecture conforming to other types of broadcasting or communication standards and its dependent transmission technique. For example, the vibration control information can be transmitted using FLUTE of DVB-H. FIG. 13 is a diagram illustrating a protocol stack of DVB-H. FLUTE of FIG. 13 refers to a protocol for transmitting a file such as an eXtensible Markup Language (XML) file or a binary file in a DVB-H broadcasting system. The file comprises a variety of additional types of information such as channel information or control information. The vibration control information according to embodiments of the present invention can be configured and transmitted in a transmissible file format, using FLUTE.

In an alternate embodiment, the vibration control information can also be transmitted using a PRIVate extension (PRIV) type of a Source DEScription (SDES) packet of Real-time Transport Control Protocol (RTCP). RTCP is a control protocol of Real-time Transport Protocol (RTP). RTP refers to a transport layer communication standard for transmitting and receiving a voice or data call in real time. In this specification, reference will be to an RFC 3550 standard that defines RTP and RTCP.

The vibration control information may be transmitted in the PRIV type of the SDES packet of RTCP.

RTCP is a protocol for controlling and managing an RTP session. RTCP is paired with RTP. RTCP provides information on a transmission quality to the terminal. There are a Sender Report (SR), a Receiver Report (RR), and a Source DEScription (SDES) in an RTCP packet type. Among them, the SDES is used to transmit information on a sender.

Figure 14:
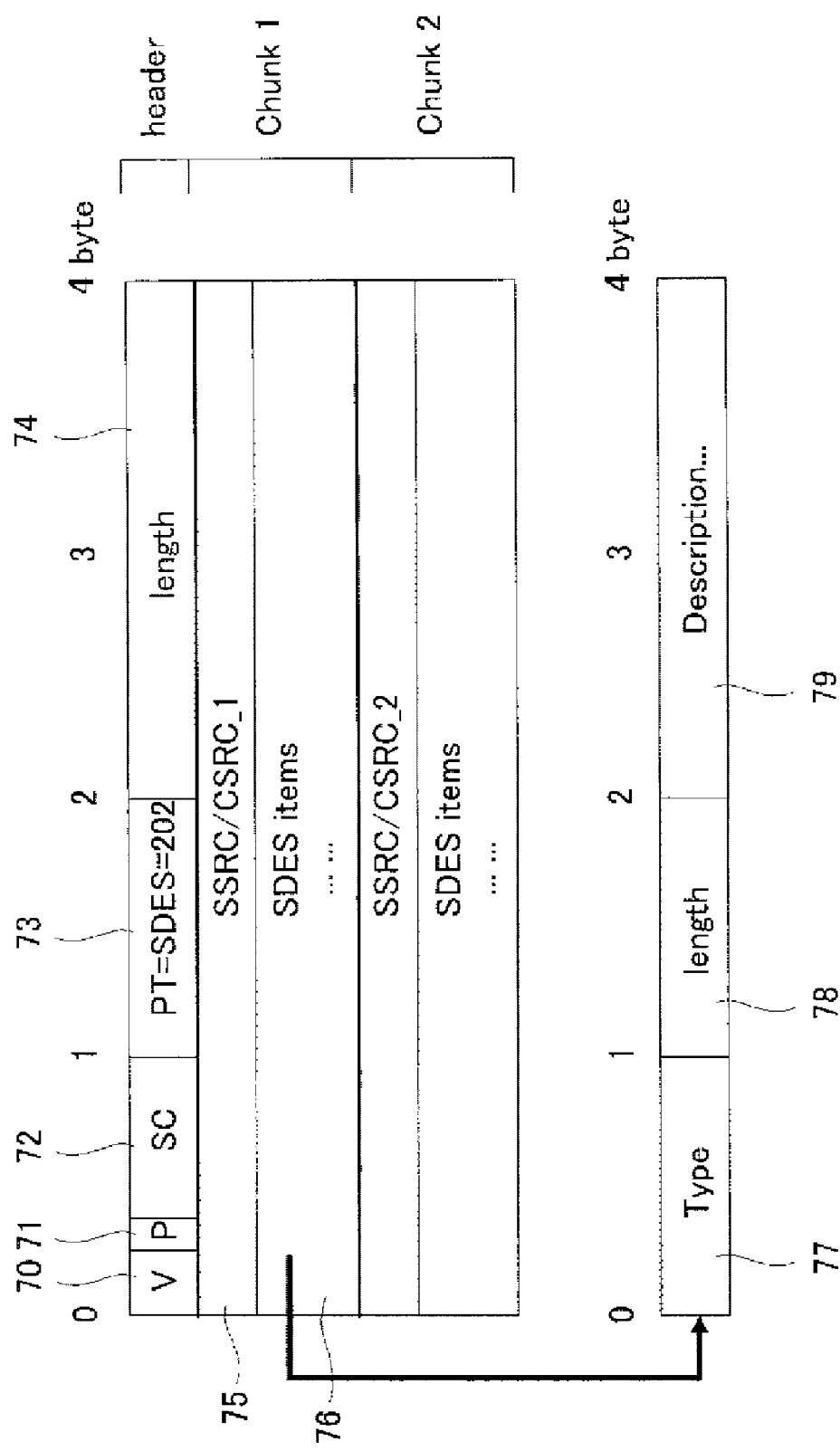
FIG. 14 is a diagram illustrating an example of a packet format of SDES of RTCP.

FIG. 14 is a diagram illustrating an example of a format of the SDES packet of RTCP. As shown in FIG. 14, the format of the SDES packet of RTCP comprises Version (V) 70, Padding (P) 71, Source Count (SC) 72, Packet Type (PT) 73, length 74, Synchronization Source (SSRC) 75, and SDES items 76. The Version (V) 70 represents a protocol version (2 bits). The Padding (P) 71 represents that there exists a padded portion at a payload end when it is set with "1" (1 bit). The Source Count (SC) 72 represents the number of SSRC/Content Source (CSRC) chunks comprised in the SDES packet (5 bits). The Packet Type (PT) 73 refers to the RTCP packet type, and has a value of "202" in the SDES packet (8 bits). The length 74 represents a length of an RTCP packet including header and padding (16 bits). The SSRC 75 is an identifier of a source of the SDES packet (32 bits). The SDES items 76 represent a portion that includes SDES information. Type 77 refers to a type of a corresponding field, and has a value of 1 to 8. Length 78 represents a size of a next description field. Description 79 is a portion with data actually inserted.

Figure 16:
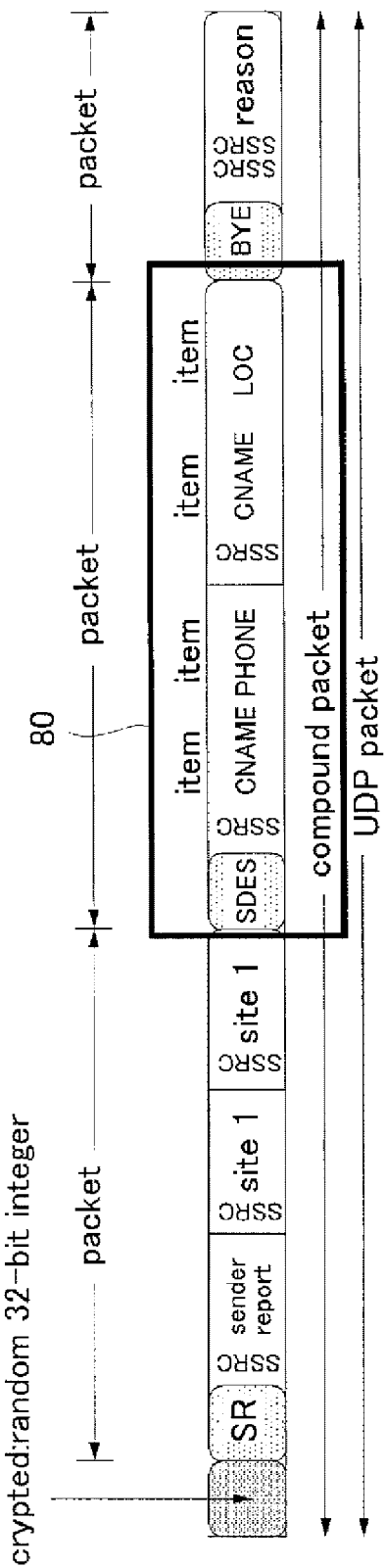
FIG. 16 is a diagram illustrating an example of an RTCP compound packet.

FIG. 15 is a diagram illustrating various fields comprised in an RTCP compound packet. FIG. 16 is a diagram illustrating an example of the RTCP compound packet. The vibration control information according to an embodiment of the present invention can be transmitted in the PRIV type 80 shown in FIGS. 15 and 16.

Figure 17:
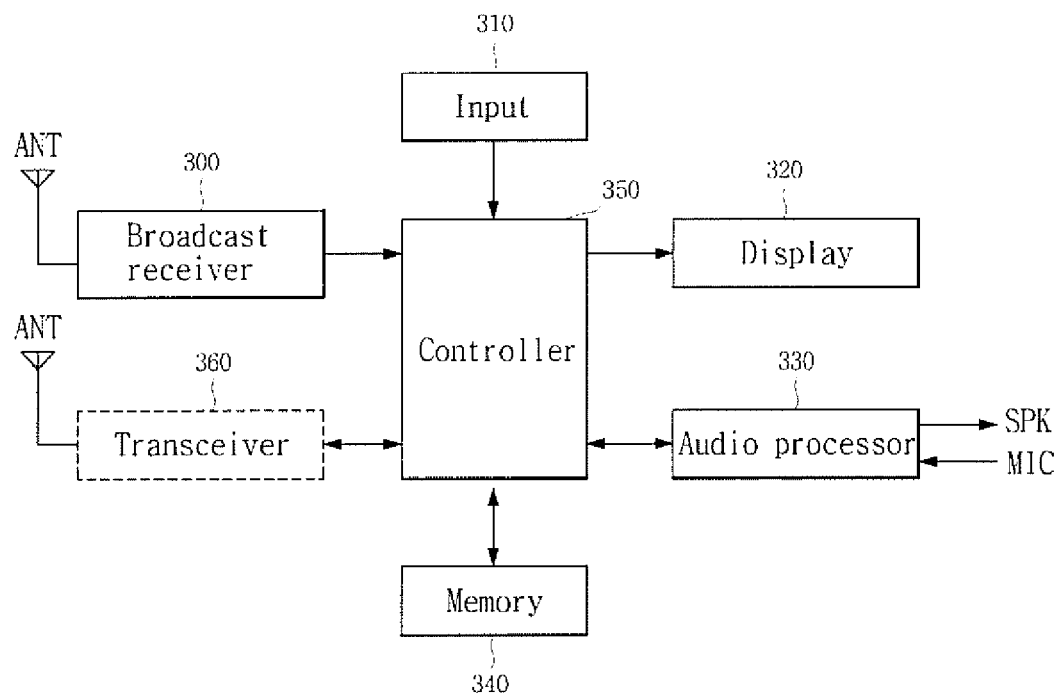
FIG. 17 is a schematic block diagram illustrating a broadcasting terminal for receiving broadcast data containing vibration control information according to an exemplary embodiment of the present invention.
Figure 18:
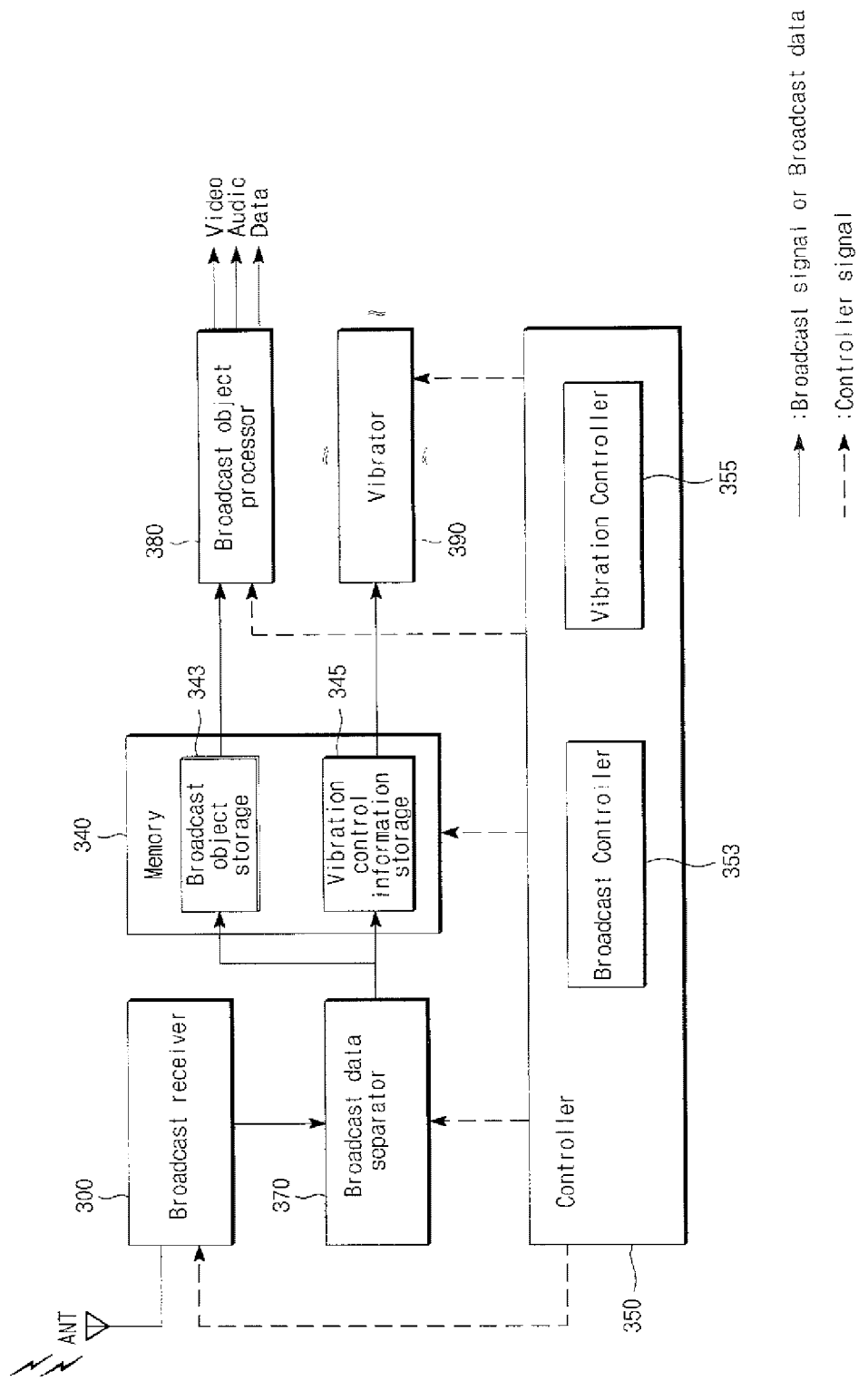
FIG. 18 is a block diagram illustrating a detailed construction of a broadcasting terminal according to an exemplary embodiment of the present invention.

FIG. 17 is a schematic block diagram illustrating the mobile terminal 110 for receiving the broadcast data containing vibration control information according to an exemplary embodiment of the present invention. FIG. 18 is a block diagram illustrating a detailed construction of the broadcasting terminal according to another exemplary embodiment of the present invention.

The mobile terminal 110 receives the broadcast data containing vibration control information and includes a broadcast receiver 300, an input 310, a display 320, an audio processor 330, a memory 340, a controller 350, a broadcast data separator 370, a broadcast object processor 380, and a vibration device 390.

The broadcast receiver 300 is a radio communication device for receiving a broadcast signal from a broadcast network. The broadcast receiver 300 demodulates the received broadcast signal, and outputs a data signal. The broadcast receiver 300 receives the broadcast signal comprising the vibration control information from the broadcasting station 100 over a broadcast channel, and demodulates the received broadcast signal. The broadcast signal may include a broadcast object. A broadcast object may include multimedia contents such as video, audio, and data.

The broadcast data separator 370 receives broadcast data which includes vibration control information from the broadcast receiver 300. The broadcast data separator 370 separates the received broadcast data into a broadcast object and vibration control information, and transmits such information to the memory 340.

Broadcast object and vibration control information each may be received over separate broadcast channels. For example, vibration control information may be received using the data architecture based on BIFS, MOT protocol, or other types of broadcasting or communication standards, as described above.

The input 310 refers to an input device for receiving each type of information or command from a user. The input 310 can be realized using a key pad which includes various numeric keys and direction keys, a touch pad, or a touch screen.

The display 320 refers to a display device for displaying a state or various types of information of the mobile terminal 110.

The audio processor 330 processes the audio to input and output the audio through a microphone (MIC) and a speaker (SPK). The audio processor 330 processes the audio to output various processing and control operations, or to input various types of information and commands via the microphone (MIC).

The memory 340 stores a predetermined program for controlling a general operation of the mobile terminal 110. The memory 340 stores data inputted/outputted and each type of data processed when the mobile terminal 110 is operated under the control of the controller 350. The memory 340 can comprise the broadcast object storage 343 and the vibration control information storage 345. The broadcast object storage 343 receives the broadcast object from the broadcast data separator 370, and temporarily or permanently stores the received broadcast object. The vibration control information storage 345 receives the vibration control information from the broadcast data separator 370, and temporarily or permanently stores the received vibration control information.

In one embodiment, the mobile terminal 110 can comprise a transceiver 360. The transceiver 360 refers to a radio communication device for data communication with a mobile communication network. The transceiver 360 is required for a communication function focused towards voice communication or a data communication in addition to a broadcast receiving function. In particular, a broadcasting terminal later described according to an exemplary embodiment of the present invention requires the transceiver 360 for utilizing a two-way broadcasting service.

The broadcast object processor 380 is a module for processing the broadcast object to reproduce the broadcast object. An example of the broadcast object processor 380 is an Audio/Video (A/V) decoder. For example, the broadcast object processor 380 decodes and outputs the video and audio when the broadcast object comprises video and audio.

The vibration device 390 is a module which has a vibration motor and a vibration element for generating the vibration of the terminal 110 depending on a control signal of the controller 350. The vibration element generates the vibration using the vibration motor. A detailed construction and an operation of the vibration device 390 are known, and thus, their detailed descriptions will be omitted for clarity.

The controller 350 controls various components of the mobile terminal 110. The controller 350 can comprise a broadcasting controller 353 and a vibration controller 355. The broadcasting controller 353 controls the broadcast object processor 380, and controls this broadcasting relation function as reproducing the stored broadcast object of the broadcast object storage 343 by a video, audio, or data format. The vibration controller 355 controls the vibration device 390. In particular, the vibration controller 355 controls the vibration device 390 depending on the vibration control information stored in the vibration control information storage 345.

According to an exemplary embodiment of the present invention, the mobile terminal 110 and the controller 350 will be discussed below.

The vibration controller 355 controls the vibration device 390 depending on the vibration control information received from the broadcast receiver 300. As described above, the vibration control information can comprise at least one of a vibration or non-vibration state, vibration time, vibration duration, and vibration pattern. For example, in the case where the received vibration control information comprises a specific vibration time and a specific vibration pattern, the vibration controller 355 controls the vibrator 390 to generate the vibration by the specific vibration pattern at the specific vibration time.

In the situation where the received broadcast data comprises the broadcast object such as the multimedia content, the controller 350 controls the broadcast object processor 380 using the broadcasting controller 353, thereby reproducing the broadcast object. The controller 350 controls the vibration device 390 using the vibration controller 355 to generate vibration depending on the vibration control information comprised in the received broadcast data while reproducing the broadcast object.

The vibration control information can synchronize with a time when the broadcast object is reproduced. For example, in the case where the broadcast object is a specific image, the vibration control information can synchronize to be enabled at the time when the specific image is displayed on the display 320.

The vibration control information can synchronize with a particular type of content from a broadcast object. For example, the vibration control information can synchronize to be enabled at the scene of scoring a goal in the soccer game.

Upon a request of the mobile terminal 110, the vibration control information can be transmitted in the broadcast data as described below. Various exemplary embodiments and their detailed descriptions will be described below. Operation of various components element of the mobile terminal 110 for transmitting/receiving the vibration control information upon the request of the mobile terminal 110 will be described below.

The request of the mobile terminal 110 can be implemented while the mobile terminal 110 receives the broadcast data over the broadcast channel. For example, while the user of the mobile terminal 110 views the broadcast program by reproducing the received broadcast object the user can transmit a predetermined message to the broadcasting station 100 by the user's manipulation of the input 310. Upon the receipt of the message, the broadcasting station 100 transmits the broadcast data which has vibration control information to mobile terminal 110.

In the scenario where the broadcast channel is a one-way channel, the request of the terminal 110 is implemented over the return channel, which is separate from the broadcast channel. The mobile terminal 110 may comprise a radio communication module for data communication with the radio communication network. An example of a radio communication module is the transceiver 360. The mobile terminal 110 can connect to a wired/wireless Internet network through the transceiver 360. For example, the radio communication module can be a portable Internet module for data communication with a portable Internet network. The broadcasting station 100 can receive the request of the mobile terminal 110 through the wired/wireless Internet network or the portable Internet network.

In an embodiment where the broadcast channel is a two-way channel, the request of the mobile terminal 110 can be implemented over the broadcast channel.

The vibration control function of the mobile terminal may be selectively enabled or disabled. For example, the user can turn on or off the vibration control function using the input 310. When the vibration control function of the mobile terminal 110 is disabled or turned off, the mobile terminal 110 does not vibrate after receiving the vibration control information.

However, the vibration control information can comprise the vibration override code for forcing the vibration of the mobile terminal 110 as described above.

In the case where the vibration control function is disabled and the received vibration control information comprises the vibration override code, the controller 350 can enable the generation of the vibration irrespective of disabled setting. In one embodiment, where the received vibration control information comprises the vibration override code, the vibration override code can temporarily enable the vibration control function or enable the vibration control function until it is set to disable.

The broadcast receiver 300 further receives the organization table on the vibration control information. After the controller 350 sets, by the input of the terminal, at least one piece of vibration control information to be enabled in the terminal with reference to the received organization table, it can control the mobile terminal 110 to generate the vibration depending on the set vibration control information. A detailed description of the enabling of the vibration control information using the organization table will be later described with reference to FIGS. 23 to 25.

Figure 19:
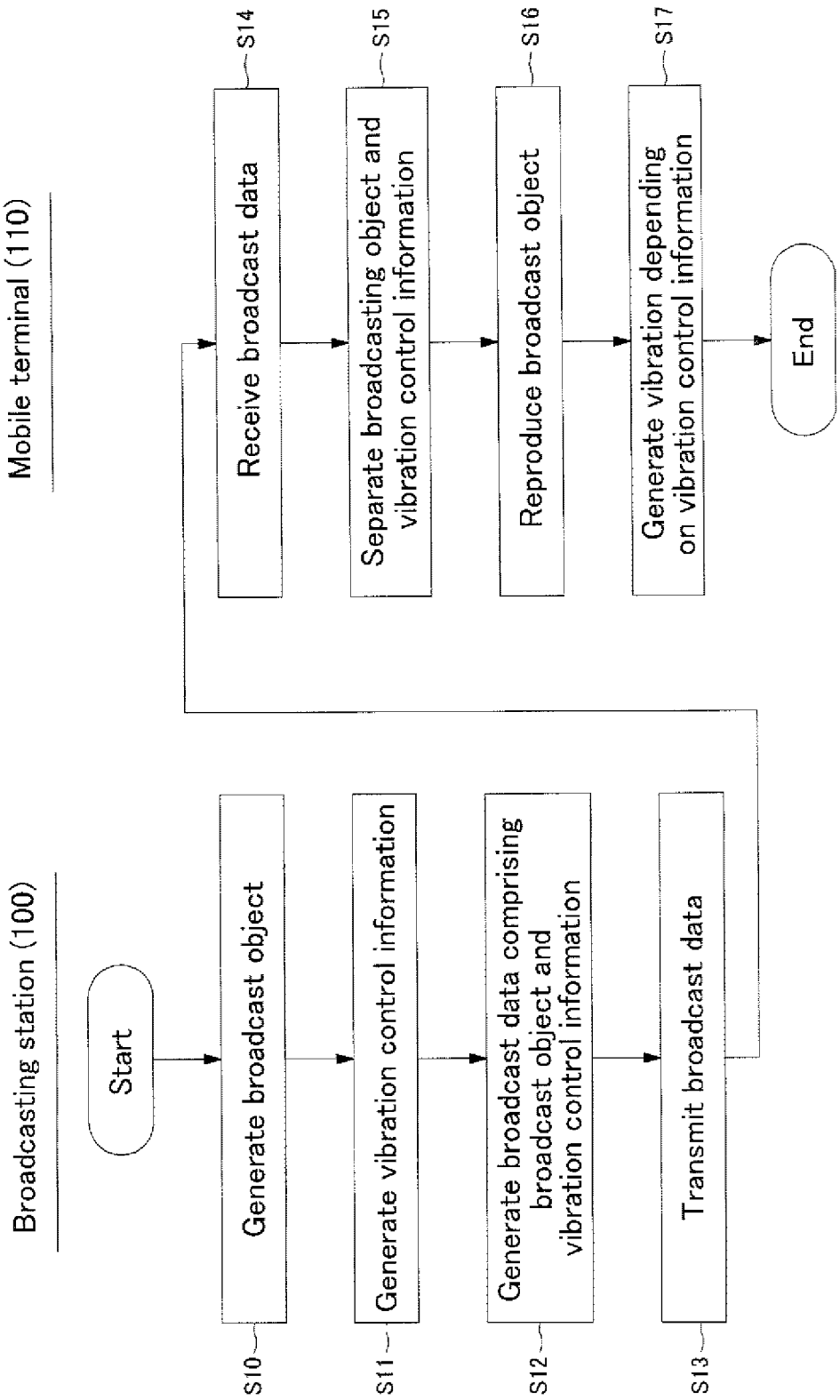
FIG. 19 is a flowchart illustrating a method of controlling vibration of a broadcasting terminal according to another exemplary embodiment of the present invention.

FIG. 19 is a flowchart illustrating a method of controlling the vibration of the broadcasting terminal according to another exemplary embodiment of the present invention. A detailed description of the method of controlling the vibration of the broadcasting terminal shown in FIGS. 17 and 18 will be made with reference to FIG. 19 as follows.

A broadcasting station 100 generates a broadcast object and vibration control information. Block S10 generates a broadcast object and block S11 generates vibration control information. The generated broadcast object and vibration control information can be synchronized with each other.

S12 recites the broadcasting station 100 generating transmissible broadcast data with a broadcast object and vibration control information. Block S13 recites transmission of the converted broadcast data.

Block S14 recites mobile terminal 110 receiving the generated broadcast data from the broadcasting station 100.

Block S15 separates the broadcast object and the vibration control information from the received broadcast data. Block S16 will then reproduce the broadcast object. Then block S17 will generate vibration depending on the vibration control information.

A cause of generating the vibration control information may be diversified. For example, two such causes are as follows.

First, the vibration control information can be generated originating from a self-decision of the broadcasting station 100. In particular, the broadcasting station 100 generates the vibration control information to provide various types of services to a user of a mobile terminal 110. The generated vibration control information can be interworked or synchronized with the broadcast object, and can be provided to the user. Thus, the user may utilize a number of broadcasting services.

Second, the vibration control information can be generated originating from a request of the user. For example, the broadcasting station 100 can receive a specific request message from the mobile terminal 110 while broadcasting a specific broadcast program. The broadcasting station 100 can generate and transmit the vibration control information as a response message to the received request message.

A technique for generating the vibration control information originating from the request of the user may be based on a two-way data service. That is, data transmission from the broadcasting station 100 to the terminal 110, and vice versa, may be implemented.

In the case where a broadcast channel is a one-way broadcast channel, a two-way data service often requires a return channel separate from the broadcast channel. When the broadcast channel is a one-way broadcast channel, it is difficult to transmit data from the terminal 110 to the broadcasting station 100 using the broadcast channel itself. Korean terrestrial DMB is an example of a one-way broadcast channel. An example of a return channel is a mobile communication network (for example, GSM/CDMA) or a portable Internet network (for example, WiBRO/WiMAX).

When the broadcast channel is a two-way broadcast channel, it is possible to transmit data from the terminal 110 to the broadcasting station 100 over the broadcast channel. Thus, the request message for generating and transmitting the vibration control information can be transmitted from the mobile terminal 110 to the broadcasting station 100 over the broadcast channel. DVB-H is an example of a two-way broadcast channel. DVB-H is based on an Internet Protocol (IP), and thus, can provide a two-way service.

An example of a method for generating vibration control information in response to the user's request is as follows. It is considered that home shopping broadcasting is implemented over a shopping-only broadcast channel. In the case where the two-way service is possible during broadcasting, a purchase decision and payment for specific goods should be implemented in the mobile terminal 110. The purchase decision or payment is based on a two-way communication with the broadcasting station 100. In the case where the user completes the purchase decision or payment for the specific goods using the two-way service, the broadcasting station 100 should send a notification of a processing result (for example, processing success or failure) of the purchase decision or payment to the user. The notification of the processing result can be forwarded using a text message format or a voice format. However, together with the calling user's attention based on sight and hearing, the user's attention is additionally drawn to the tactile sensation provided by the vibration of terminal 110.

Figure 20:
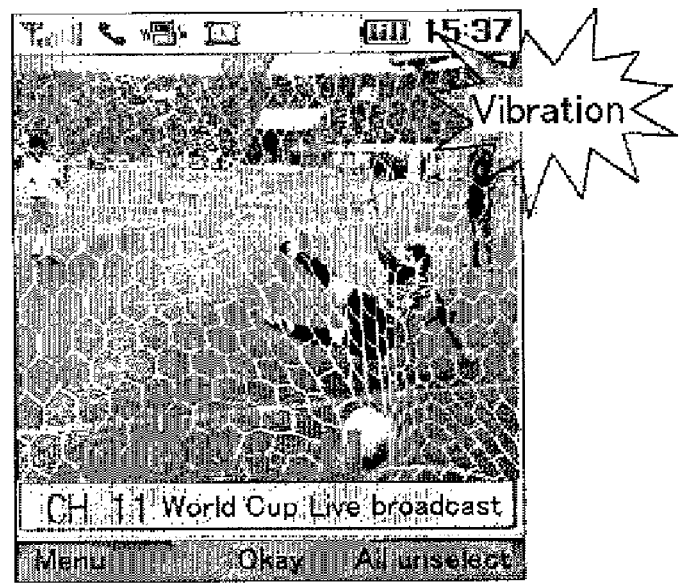
FIGS. 20 to 22 are diagrams illustrating examples of situations in which vibration of a broadcasting terminal is generated according to an embodiment of the present invention.
Figure 21:
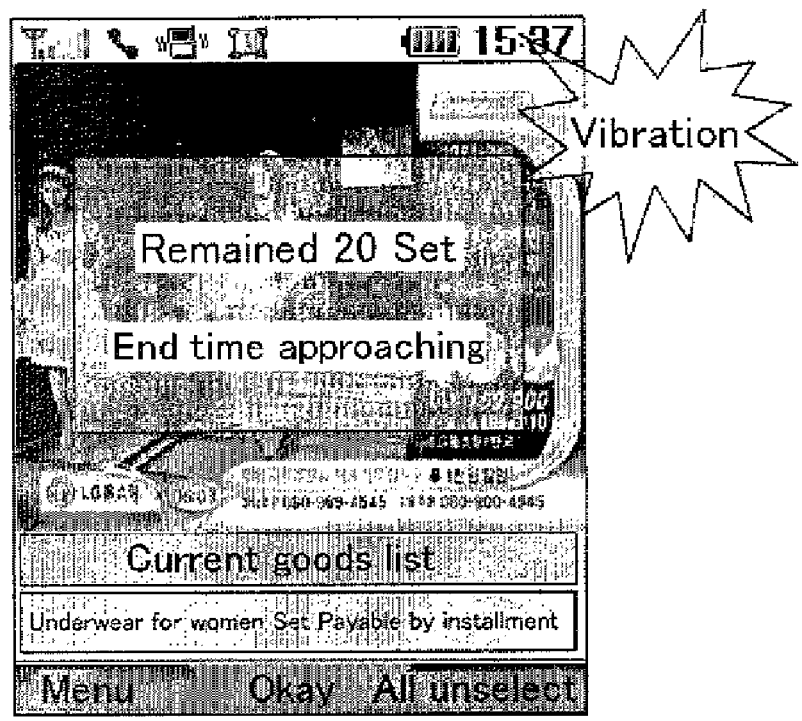
Figure 22:
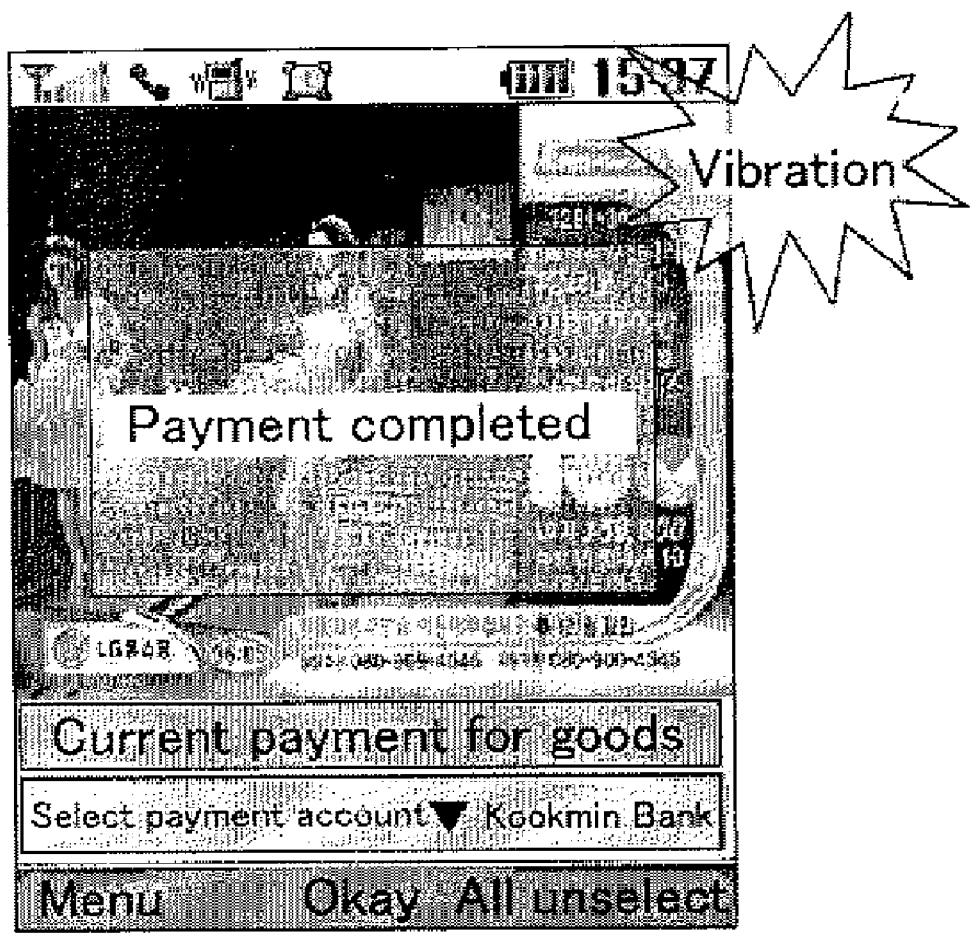

FIGS. 20 to 22 are diagrams illustrating examples of situations in which vibration of the broadcasting terminal is generated in accordance with embodiments of the present invention.

FIG. 20 is a diagram illustrating the situation in which the vibration of the broadcasting terminal is generated when a goal is scored in a soccer game. For example, the broadcasting station 100 transmits the vibration control information, together with the goal scene, to the mobile terminal 110 when any team scores a goal in a soccer game. As shown in FIG. 20, the mobile terminal 110 generates vibration depending on the received vibration control information when receiving and reproducing the goal scene. The user of the mobile terminal 110 will have an enhanced experience when viewing the soccer game because of the vibration generated at the goal scene.

FIG. 21 is a diagram illustrating the situation in which vibration is generated when an ending time occurs for purchasing specific goods during a home shopping broadcast. For example, the broadcasting station 100 transmits the vibration control information to the mobile terminal 110 at a specific time point when the ending time for the purchase of a specific good nears. The mobile terminal 110 generates vibration depending on the received vibration control information, e.g., upon the receipt of the vibration control information or depending on the vibration time comprised in the vibration control information. The broadcasting station 100 or a seller for specific goods can attract, by the vibration, the user's attention to the approaching of the ending time for the sale of a specific good during the home shopping broadcast.

FIG. 22 is the diagram illustrating the situation in which the vibration is generated when a notification of payment completion for a specific good is sent in a two-way broadcasting service. For example, the mobile terminal 110 can decide to purchase the specific good and can perform a payment request for the specific good during the home shopping broadcast. The payment request can be implemented in the case where a two-way data communication between the broadcasting station 100 and the mobile terminal 110 is implemented. The broadcasting station 100 transmits the vibration control information, together with a data format message of "Payment Completed", to the mobile terminal 110 performing the payment request, when the payment request is successfully processed. As shown in FIG. 22, the mobile terminal 110 displays the message of "Payment Completed" on a screen, while generating the vibration responsive to the received vibration control information. The user of the mobile terminal 110 can recognize that the payment request is successfully processed, because of the generated vibration and the displayed message.

Other situations for generating vibration in the mobile terminal 110 will now be described.

For example, in the case where the broadcasting station 100 provides disaster broadcasting, it can transmit vibration control information. The disaster broadcasting refers to broadcasting an emergency situation such as an earthquake, a flood, a tornado, and other natural disasters. The disaster broadcasting can be implemented in the video, audio, and data formats. The mobile terminal 110 can receive and reproduce the disaster broadcasting and generate the vibration depending on the received vibration control information, thereby indicating the exigency of the emergency situation to the user.

Also, consider the case where a sporting event is broadcasted over a sports-only channel. During sports broadcasting, the broadcasting station 100 can insert or synchronize the vibration control information with a scene needing to call the user's attention or a scene needing to deliver a stronger feeling to the user.

Controlling vibration of the mobile terminal 110 is additionally applicable to an advertisement inserted in a broadcast. The method of controlling the vibration of the terminal according can maximize an advertisement effect, using the tactual sense, which goes beyond advertising techniques appealing only to the user's senses of sight and sound.

Additionally, when the mobile terminal vibrates according to received vibration control information, an LED may flicker, a vibration indicator may be displayed on a display, or a specific sound may be outputted from a speaker. The received vibration control information may include additional information about whether an LED flickers, a vibration indicator is displayed on a display, or a specific sound is outputted from a speaker. Alternatively, received vibration information may not include additional information, if desired, the mobile terminal may control whether the LED flickers, the indicator is displayed on the display, or the specific sound is outputted from the speaker.

Figure 23:
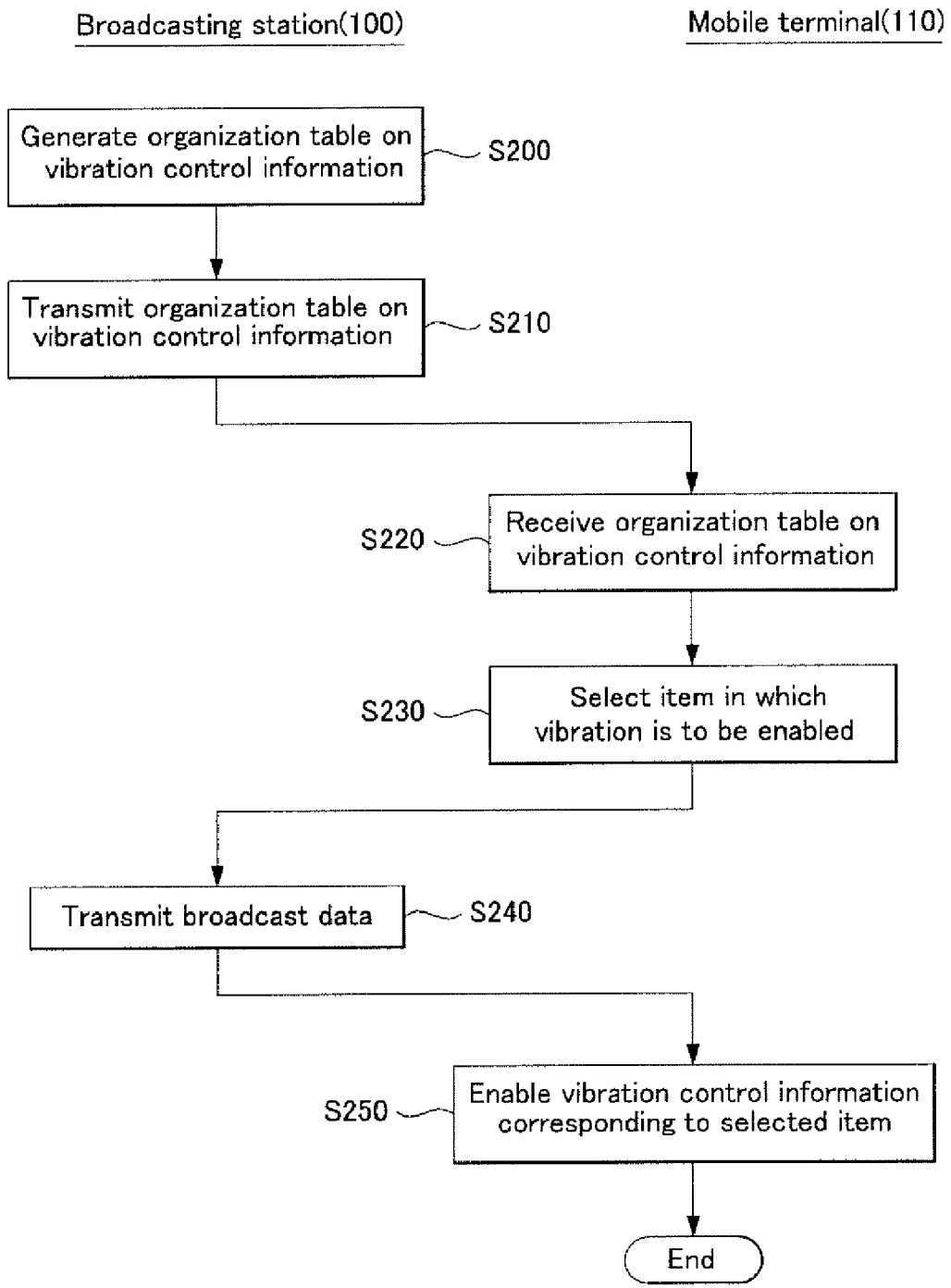
FIG. 23 is a flowchart illustrating a method of controlling a vibration of a broadcasting terminal using an organization table of vibration control information according to a further another exemplary embodiment of the present invention.

FIG. 23 is a flowchart illustrating a method of controlling the vibration of a terminal using an organization table of vibration control information according to a further exemplary embodiment of the present invention. As shown, block S200 generates an organization table of vibration control information. Block S210 then transmits the organization table of vibration control information.

Block S220 recites the mobile terminal 110 receiving the organization table, S230 recites selection of the item in which vibration is to be enabled. The mobile terminal 100 does not generate the vibration, enabling all the vibration control information received from the broadcasting station 100, and generates the vibration only when receiving the vibration control information selected in block S230.

Block S240 recites the broadcasting station 100 transmitting broadcast data. Block S250 includes enabling the vibration control information corresponding to the selected item.

Figure 24:
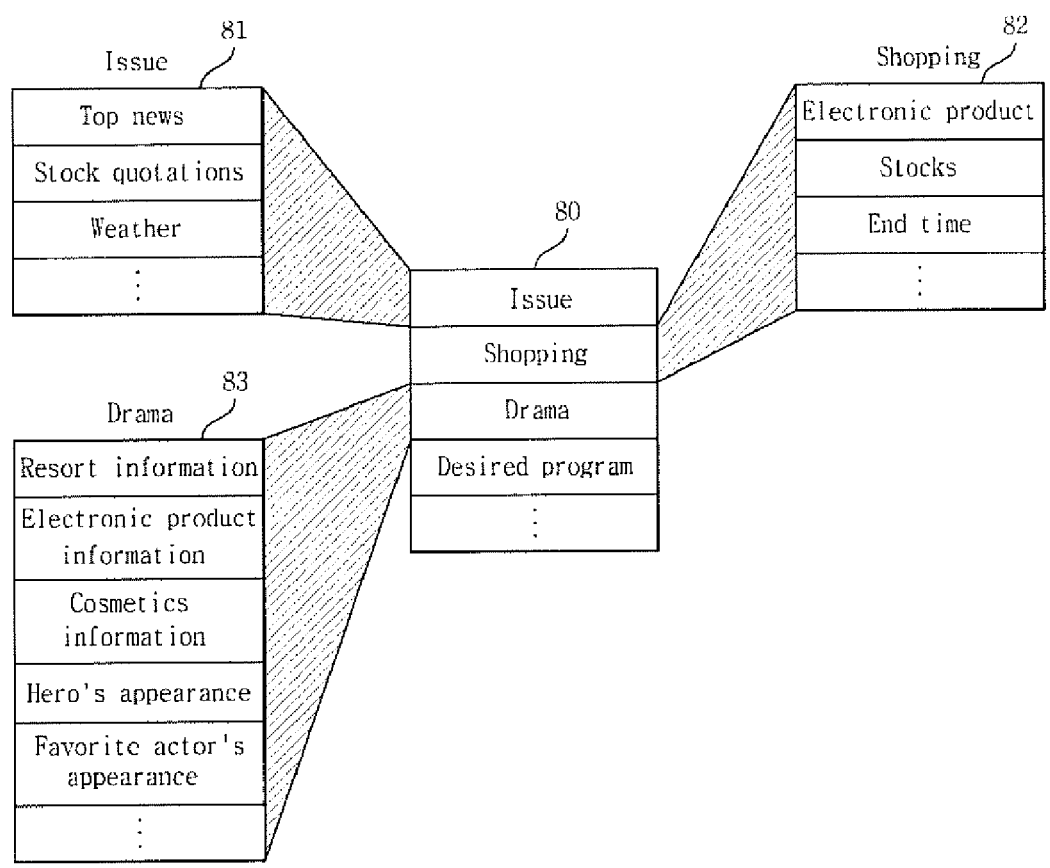
FIG. 24 is a diagram illustrating an organization table of vibration control information according to an embodiment of the present invention.

FIG. 24 is a diagram illustrating an organization table of the vibration control information according to an embodiment the present invention.

A broadcasting station 100 creates and transmits the organization table of the vibration control information (Blocks S200, S210). The organization table on the vibration control information may refer to a table organized by matching the vibration control information to be transmitted by the broadcasting station 100, with a category (or a tree architecture) classified by a predetermined criterion. In detail, the organization table represents a table for informing the terminal 100 whether the vibration control information to control the vibration of the terminal 100 is transmitted for any category.

For example, as shown in FIG. 24, the broadcasting station 100 configures a top category by "issue/shopping/drama/desired program" 80. Each category comprises sub items based on at least one sub hierarchy. For example, the top category of "issue" 81 has sub items of "top news/stock quotations/weather/ . . . ." When the broadcasting station 100 broadcasts contents on the sub items, it may transmit the vibration control information together, thereby enabling the mobile terminal 110 to reproduce the contents on the sub items while generating vibration responsive to the vibration control information.

In the organization table shown in FIG. 24, the top category (e.g., "shopping") has only one sub hierarchy. The organization table depicted in these figures is not a requirement, and the top category can have a plurality of sub hierarchies.

The broadcasting station 100 can configure the organization table using various classification criteria. The broadcasting station 100 can transmit the organization table to the mobile terminal 110 at several time points.

The broadcasting station 100 broadcasts various programs over at least one broadcast channel. Accordingly, the broadcasting station 100 can prepare various kinds of organization tables and then transmit each of the prepared organization tables at several time points.

The organization table often includes a plurality of sub hierarchies. For example, a first sub hierarchy of "top news" in the top category of "issue" 81 can have second sub hierarchies of "policy", "economy", "society", and "entertainment" (not shown). The broadcasting station 100 may transmit the organization table of vibration control information, including, only the top category and the first sub hierarchy, once a week. The broadcasting station 100 may transmit organization table of the vibration control information, including, only the top category and the first sub hierarchy, just before or in the course of broadcasting a specific program.

For example, the user may arbitrarily select at least one of the sub items comprised in the top category from the organization table on the vibration control information shown in FIG. 24, thereby previously setting the category or its sub items of the vibration control information to be enabled in the future (Block S230).

Figure 25:
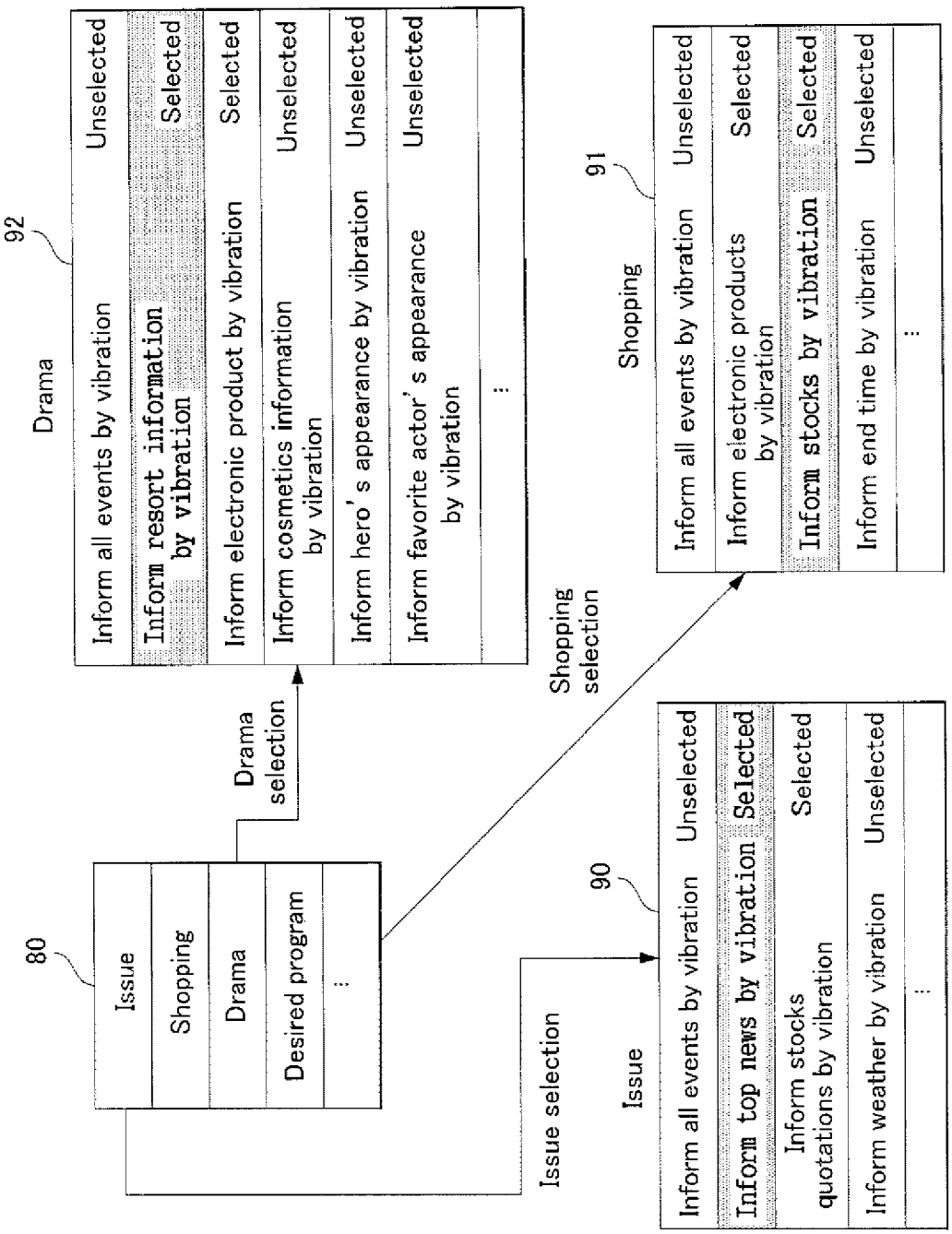
FIG. 25 is a diagram illustrating an example of a screen set with vibration control information to be enabled according to an embodiment of the present invention.

FIG. 25 is a diagram illustrating an example of a screen set with the vibration control information to be enabled according to an embodiment of the present invention. For example, the mobile terminal 110 receives the organization table of FIG. 24, and provides the user with an interface for selecting the category and the sub items comprised in the organization table. The user can select the sub items using the interface. In other words, FIG. 25 illustrates constructions of the sub items finally selected using the interface.

FIG. 25 illustrates a state in which "electronic product" and "stocks" are selected, and "end time" is unselected among the sub items for the top category of "shopping" 91.

In some scenarios, a vibration is generated only at a time point/scene desired by the user of the mobile terminal 110, thereby making the generation of the vibration in accordance with a user's preference possible. In an alternative scenario, the user may set the preference for the vibration of the mobile terminal 110 to include at least one of an LED flicker, a vibration indicator displayed on a display, or a specific sound outputted from a speaker.

The above exemplary embodiments relate to a method of transmitting the motion control information (particularly, the vibration control information) comprised in the broadcast data, thereby generating the mechanical motion (particularly, the vibration of the terminal), by the broadcasting terminal receiving the motion control information, depending on the motion control information.

However, the current embodiment is widely applicable to a terminal capable of implementing a function of communicating with remote devices. In other words, the terminal can receive motion control information, such as vibration control information, from remote devices using a predetermined communication network, and generate the mechanical motion depending on the received motion control information.

As described above, the broadcast signal transmitting apparatus and the broadcast signal transmitting and receiving method using the same have effects may be accomplished as follows.

First, one effect includes that a broadcasting station may transmit motion control information, such as vibration control information, thereby providing new types of broadcasting content.

A second effect includes that a user of a terminal may experience mechanical motion, such as vibration, while viewing the broadcast, thereby providing a new type broadcast, the tactual broadcast, which is in addition to using the senses of sight and sound.

A third effect includes providing the motion control information, such as the vibration control information by various criteria, thereby giving a new angle to broadcasting viewers and emphasizing the broadcasting contents.

A fourth effect includes an advertiser using a broadcasting station or broadcast media that may appeal to viewers or customers more positively and effectively, owing to the above effects.

Although the present invention may be implemented using the exemplary series of operations described above, additional or fewer operations may be performed. Moreover, it is to be understood that the order of operations shown and described is merely exemplary and that no single order of operation is required.

The foregoing embodiments and advantages are merely exemplary and are not to be construed as limiting the present invention. The present teaching can be readily applied to other types of apparatuses and processes. The description of the present invention is intended to be illustrative, and not to limit the scope of the claims. Many alternatives, modifications, and variations will be apparent to those skilled in the art.

Various embodiments are described in conjunction with a mobile terminal. However, such teachings apply also to other types of electronic devices. Examples of such devices include portable devices, digital broadcast receiving terminal, an MP3 player, a personal digital assistant (PDA), portable multimedia player (PMP), and the like.

What is claimed is:

1. A method of controlling vibration of a mobile terminal, the method comprising:
    receiving wireless broadcast data at the mobile terminal, the broadcast data comprising a broadcast object and vibration control information, wherein the vibration control information is for controlling the vibration of the mobile terminal, and wherein the vibration control information is implemented and transmitted in the wireless broadcast data by a request of the mobile terminal;
    vibrating the mobile terminal responsive to the vibration control information;
    outputting the broadcast object on the mobile terminal, wherein the vibrating occurs during at least a portion of a time period during which the broadcast object is outputted on the mobile terminal;
    receiving the wireless broadcast data over a two-way communication path between the mobile terminal and the broadcasting station; and
    transmitting the request to the broadcasting station via a return path of the two-way communication path.

2. The method of claim 1, wherein at least a portion of the vibration control information synchronizes with a time for outputting the broadcast object.

3. The method of claim 1, wherein at least a portion of the vibration control information synchronizes with content of the broadcast object.

4. The method of claim 1, wherein the vibration control information is received using BInary Format for Scenes (BIFS) or Multimedia Object Transfer (MOT) protocol.

5. The method of claim 1, wherein the broadcast object comprises at least one of video, audio, and data.

6. The method of claim 1, wherein the vibration control information comprises at least one of vibration time, vibration duration, and vibration pattern.

7. The method of claim 1, wherein vibration generation in the mobile terminal is selectively enabled or disabled.

8. The method of claim 7, wherein the vibration control information comprises a vibration override code which permits the vibrating in the mobile terminal even if the vibration generation in the mobile terminal is disabled.

9. A mobile terminal comprising:
a vibration device for generating vibration;
a broadcast receiver for receiving wireless broadcast data comprising a broadcast object and vibration control information, wherein the vibration control information is for controlling the vibration, wherein the vibration control information is implemented and transmitted in the wireless broadcast data by a request of the mobile terminal, and wherein the broadcast receiver is further configured to receive the wireless broadcast data over a two-way communication path between the mobile terminal and the broadcasting station;
a display for outputting the broadcast object; and
a controller for controlling the vibration device to generate the vibration, responsive to the vibration control information, wherein the vibrating occurs during at least a portion of a time period during which the broadcast object is outputted by the display; and
a transmitter configured to transmit the request to the broadcasting station via a return path of the two-way communication path.

10. The mobile terminal of claim 9, wherein at least a portion of the vibration control information synchronizes with a time for outputting the broadcast object.

11. The mobile terminal of claim 9 wherein at least a portion of the vibration control information synchronizes with content of the broadcast object.

12. The mobile terminal of claim 9, wherein the vibration control information is received using BInary Format for Scenes (BIFS) or Multimedia Object Transfer (MOT) protocol.

13. The mobile terminal of claim 9, wherein the broadcast object comprises at least one of video, audio, and data.

14. The mobile terminal of claim 9, wherein the vibration control information comprises at least one of a vibration time, vibration duration, and vibration pattern.

15. The mobile terminal of claim 9, wherein the vibration generation in the mobile terminal is selectively enabled or disabled.

16. The mobile terminal of claim 15, wherein the vibration control information comprises a vibration override code which permits the vibrating in the mobile terminal even if the vibration generation is disabled.

17. A method of controlling vibration of a mobile terminal, the method comprising:
receiving, at the mobile terminal over a first broadcast channel, a broadcast object, wherein the broadcast object is received from a transmission station of a broadcast network;
receiving, at the mobile terminal over a second broadcast channel, vibration control information, wherein the vibration control information is for controlling the vibration of the mobile terminal, and wherein the vibration control information is received from the transmission station of the broadcast network;
engaging in two-way communication between the mobile terminal and a mobile communication network, wherein the mobile communication network is a network that is different than the broadcast network;
vibrating the mobile terminal responsive to the vibration control information; and
outputting the broadcast object at a display of the mobile terminal, wherein the vibrating occurs during at least a portion of a time period during which the broadcast object is outputted at the display.

18. The method of claim 17, wherein the vibration control information is broadcast data that is permitted to be usable by the mobile terminal and any of a plurality of other mobile terminals operating within receiving range of the transmission station of the broadcast network.

19. A method of controlling vibration of a mobile terminal, the method comprising:
receiving wireless broadcast data at the mobile terminal, the broadcast data comprising a broadcast object and vibration control information, wherein the vibration control information is for controlling the vibration of the mobile terminal;
vibrating the mobile terminal responsive to the vibration control information; and
outputting the broadcast object on the mobile terminal, wherein the vibrating occurs during at least a portion of a time period during which the broadcast object is outputted on the mobile terminal; and
wherein the vibration control information is implemented and transmitted in the wireless broadcast data by a request of the mobile terminal, and wherein the request is a specific request for the vibration control information.

20. A mobile terminal comprising:
a vibration device for generating vibration;
a broadcast receiver for receiving wireless broadcast data comprising a broadcast object and vibration control information, wherein the vibration control information is for controlling the vibration;
a display for outputting the broadcast object and
a controller for controlling the vibration device to generate the vibration, responsive to the vibration control information, wherein the vibrating occurs during at least a portion of a time period during which the broadcast object is outputted by the display;
wherein the vibration control information is implemented and transmitted in the wireless broadcast data by a request of the mobile terminal, and wherein the request is a specific request for the vibration control information.

21. A method of controlling vibration of a mobile terminal, the method comprising:
receiving wireless broadcast data at the mobile terminal, the broadcast data comprising a broadcast object and vibration control information, wherein the vibration control information is for controlling the vibration of the mobile terminal, wherein the vibration control information comprises a vibration override code, and wherein the vibration control information is received from a broadcasting station responsive to a request from the mobile terminal;
permitting vibration generation in the mobile terminal to be selectively enabled or disabled;
vibrating the mobile terminal responsive to the vibration control information, wherein the vibration override code permits the vibrating of the mobile terminal to occur while the vibration generation of the mobile terminal has been disabled; and outputting the broadcast object on the mobile terminal, wherein the vibrating occurs during at least a portion of a time period during which the broadcast object is outputted on the mobile terminal.

22. A method of controlling vibration of a mobile terminal, the method comprising:

receiving, at the mobile terminal over a first broadcast channel, wireless broadcast data, wherein the broadcast data is received from a broadcasting station;

transmitting, from the mobile terminal to the broadcasting station, specific data, wherein the transmitted specific data is transmitted during a period of time during which the broadcast data is received at the mobile terminal, and wherein the specific data is related to the received broadcast data;

receiving, at the mobile terminal, vibration control information from the broadcasting station as a response to the transmitting of the specific data from the mobile terminal, wherein the vibration control information is for controlling the vibration of the mobile terminal;

vibrating the mobile terminal responsive to the vibration control information; and outputting the broadcast data at a display of the mobile terminal, wherein the vibrating occurs during at least a portion of a time period during which the broadcast data is outputted at the display.

23. The method of claim 22, wherein the vibration control information is included in the broadcast data and the vibration control information is received over the first broadcast channel.

24. The method of claim 23, further comprising:
permitting vibration generation in the mobile terminal to be selectively enabled or disabled, and
wherein the vibration control information comprises a vibration override code, and
wherein the vibration override code permits the vibrating of the mobile terminal to occur while the vibration generation of the mobile terminal has been enabled.

25. The method of claim 22, wherein the vibration control information is received over a second broadcast channel different from the first broadcast channel.

26. The method of claim 22, wherein the transmission of the specific data is implemented over a return channel different from the first broadcast channel, when the first broadcast channel is a one-way communication path.

27. The method of claim 22, wherein the transmission of the specific data is implemented over the first broadcast channel, when the first broadcast channel is a two-way communication path.

28. The method of claim 22, wherein the specific data comprises a request for a specific processing related to a specific broadcast object included in the received broadcast data, and wherein the vibration control information indicates a result of the specific processing of the broadcast station.

29. A mobile terminal, comprising:
a vibration device for generating vibration;
a broadcast receiver configured to receive, over a first broadcast channel, wireless broadcast data, wherein the broadcast data is received from a broadcasting station;
a transmitter configured to transmit to the broadcasting station, specific data, wherein the transmitted specific data is transmitted during a period of time during which the broadcast data is received at the mobile terminal, and wherein the specific data is related to the received broadcast data;
a display for outputting the broadcast data;
wherein the broadcast receiver is further configured to receive vibration control information from the broadcasting station as a response to the transmitting of the specific data, wherein the vibration control information is for controlling the vibration of the mobile terminal; and
a controller configured to control the vibration device to generate the vibration responsive to the vibration control information, and to cause displaying of the broadcast data at the display, wherein the vibrating occurs during at least a portion of a time period during which the broadcast data is displayed.

30. The mobile terminal of claim 29, wherein the vibration control information is included in the broadcast data and the vibration control information is received over the first broadcast channel.

31. The mobile terminal of claim 29, wherein the vibration control information is received over a second broadcast channel different from the first broadcast channel.

32. The mobile terminal of claim 31, wherein the controller is further configured to:
permit vibration generation in the mobile terminal to be selectively enabled or disabled, and
wherein the vibration control information comprises a vibration override code, and
wherein the vibration override code permits the vibrating of the mobile terminal to occur while the vibration generation of the mobile terminal has been enabled.

33. The mobile terminal of claim 29, wherein the transmission of the specific data is implemented over a return channel different from the first broadcast channel, when the first broadcast channel is a one-way communication path.

34. The mobile terminal of claim 29, wherein the transmission of the specific data is implemented over the first broadcast channel, when the first broadcast channel is a two-way communication path.

35. The mobile terminal of claim 29, wherein the specific data comprises a request for a specific processing related to a specific broadcast object included in the received broadcast data, and wherein the vibration control information indicates a result of the specific processing of the broadcast station.

* * * * *